(12) United States Patent
Kinder

(10) Patent No.: US 12,311,726 B2
(45) Date of Patent: May 27, 2025

(54) BATTERY COOLING UNIT INTERMEDIATE PLATE WITH CONTINUOUS AND DISCONTINUOUS RIBS

(71) Applicant: Dana Canada Corporation, Oakville (CA)

(72) Inventor: Lee M. Kinder, Oakville (CA)

(73) Assignee: DANA CANADA CORPORATION, Oakville (CA)

( * ) Notice: Subject to any disclaimer, the term of this patent is extended or adjusted under 35 U.S.C. 154(b) by 360 days.

(21) Appl. No.: 17/820,517

(22) Filed: Aug. 17, 2022

(65) Prior Publication Data
US 2024/0059120 A1    Feb. 22, 2024

(51) Int. Cl.
*B60H 1/00*    (2006.01)

(52) U.S. Cl.
CPC .............. *B60H 1/00278* (2013.01)

(58) Field of Classification Search
CPC ..... B60K 1/04; B60H 1/00278; F28D 9/0062; H01M 10/613; H01M 10/625; H01M 10/6556; H01M 10/6568
See application file for complete search history.

(56) References Cited

U.S. PATENT DOCUMENTS

| | | |
|---|---|---|
| 7,182,125 B2 | 2/2007 | Martin et al. |
| 10,006,722 B2 | 6/2018 | Kenney et al. |
| 10,601,093 B2 | 3/2020 | Vanderwees et al. |
| 11,316,216 B2 | 4/2022 | Graves et al. |
| 2003/0164233 A1* | 9/2003 | Wu .............. F28F 3/12 165/166 |
| 2020/0153062 A1 | 5/2020 | Collins |
| 2023/0264541 A1* | 8/2023 | Durbecq ........... F01P 5/06 62/498 |
| 2023/0322041 A1* | 10/2023 | White ........... B60H 1/00278 62/460 |

FOREIGN PATENT DOCUMENTS

CN    210464116 U    5/2020

\* cited by examiner

*Primary Examiner* — Henry T Crenshaw
*Assistant Examiner* — Kamran Tavakoldavani
(74) *Attorney, Agent, or Firm* — McCoy Russell LLP

(57) ABSTRACT

A battery heat exchanger for a vehicle may include a first outer plate; a second outer plate positioned in parallel with the first outer plate; a fluid inlet; a fluid outlet; and an intermediate plate positioned between the first outer plate and the second outer plate, the intermediate plate comprising a rib to separate an inlet portion from an outlet portion of the heat exchanger; and a plurality of corrugations with openings for thermal exchange medium fluid flow, where the corrugations have different orientations and lengths.

18 Claims, 15 Drawing Sheets

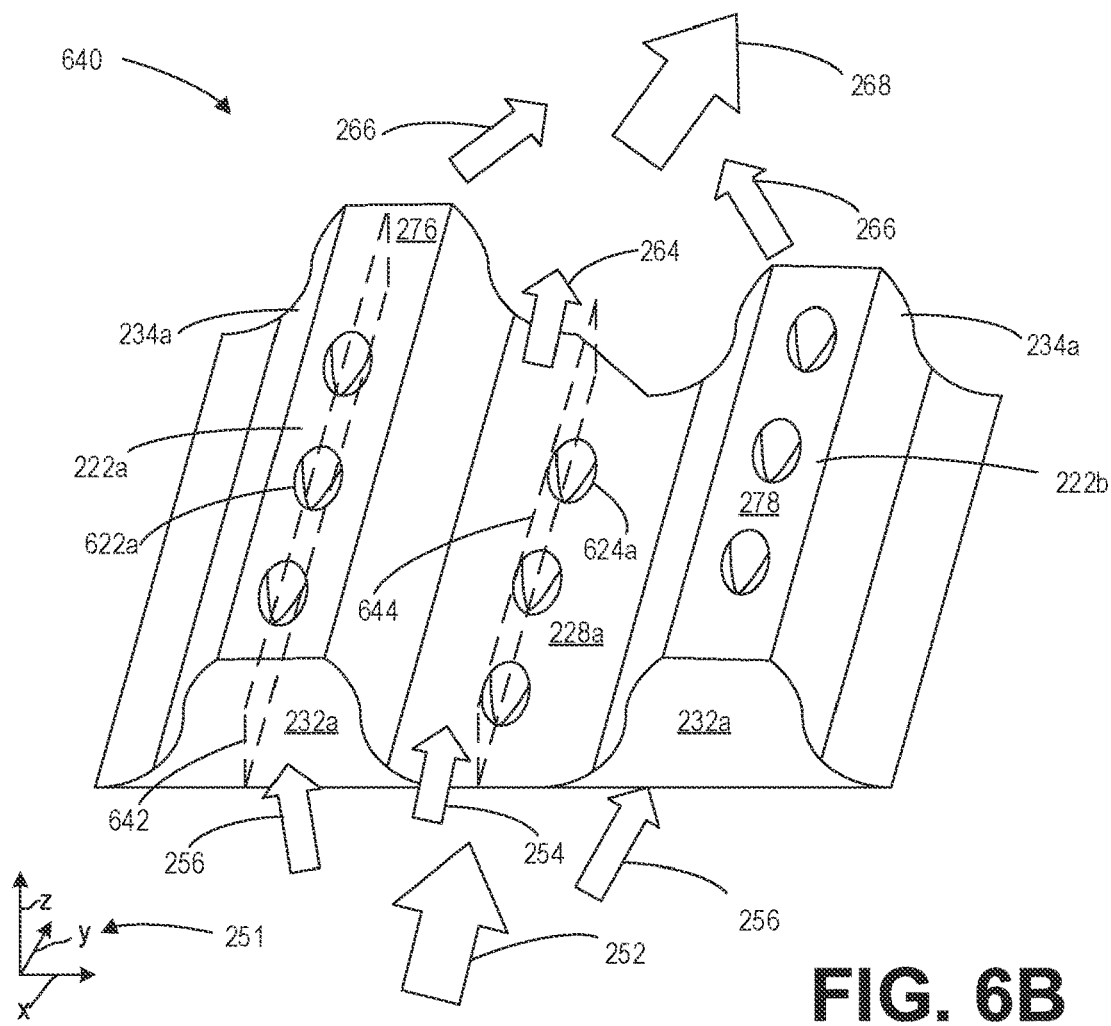
FIG. 6B
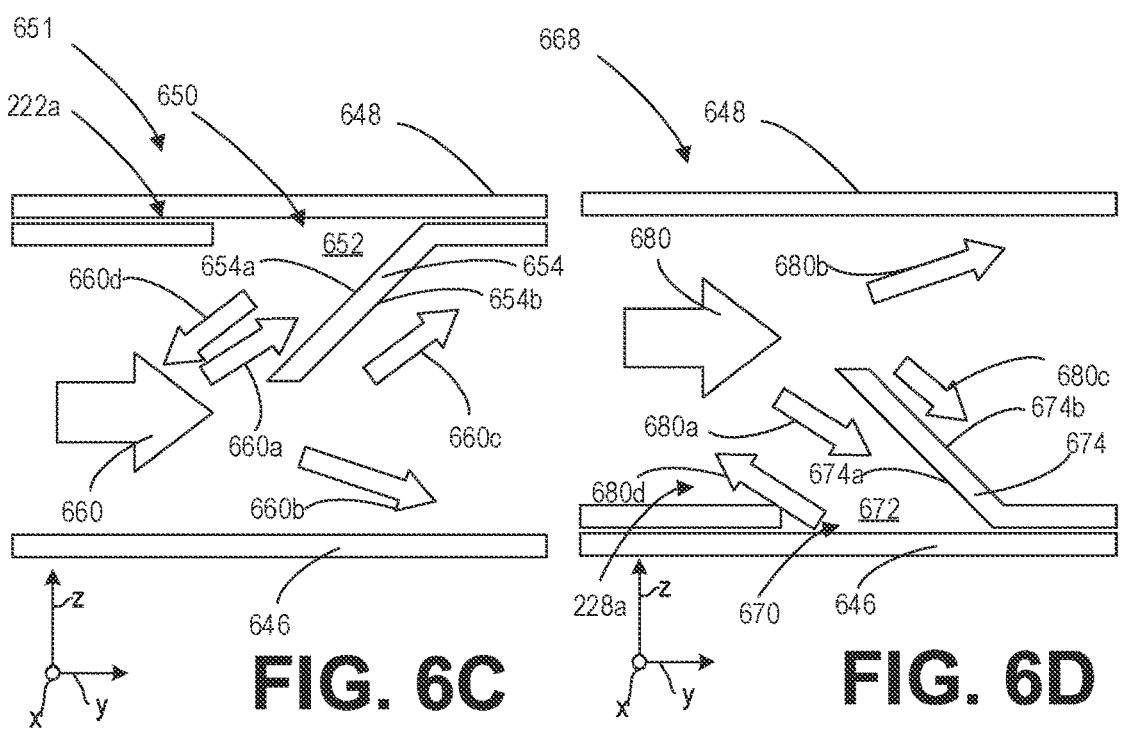
FIG. 6C
FIG. 6D

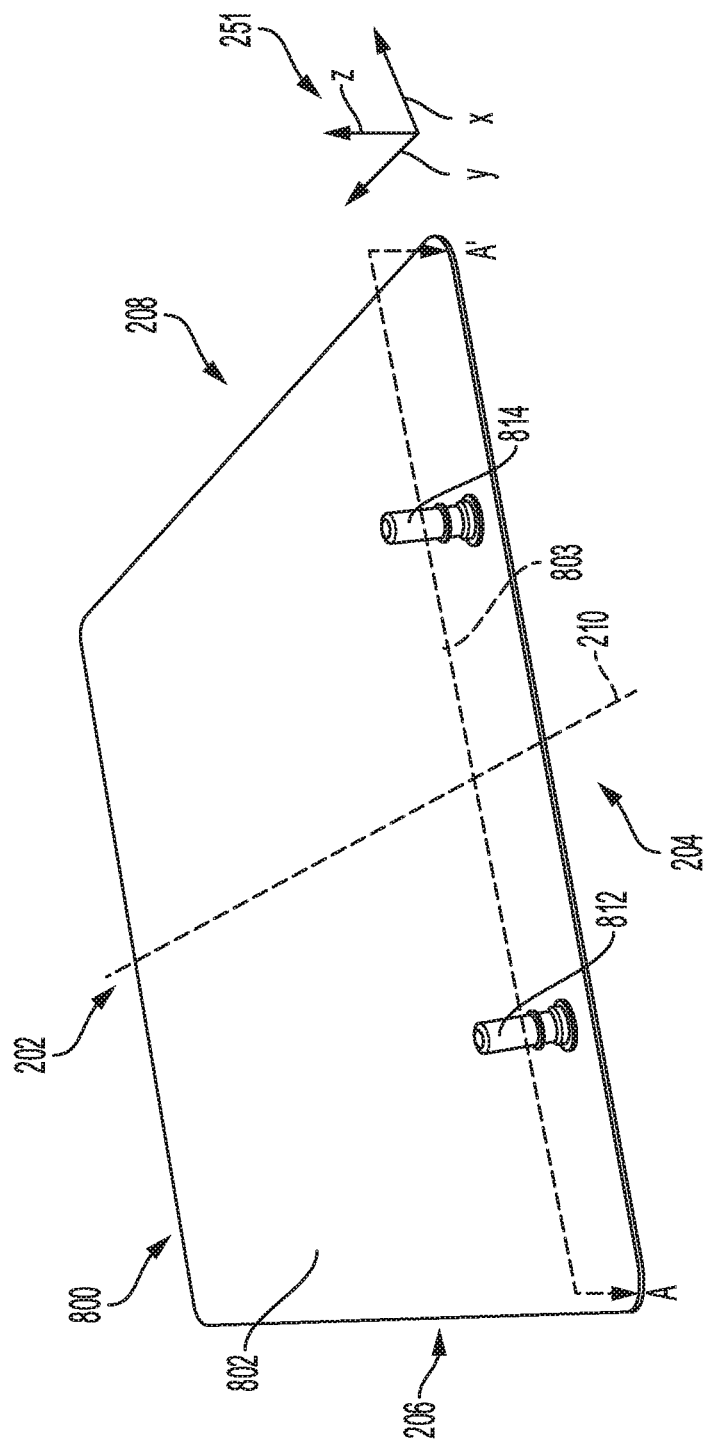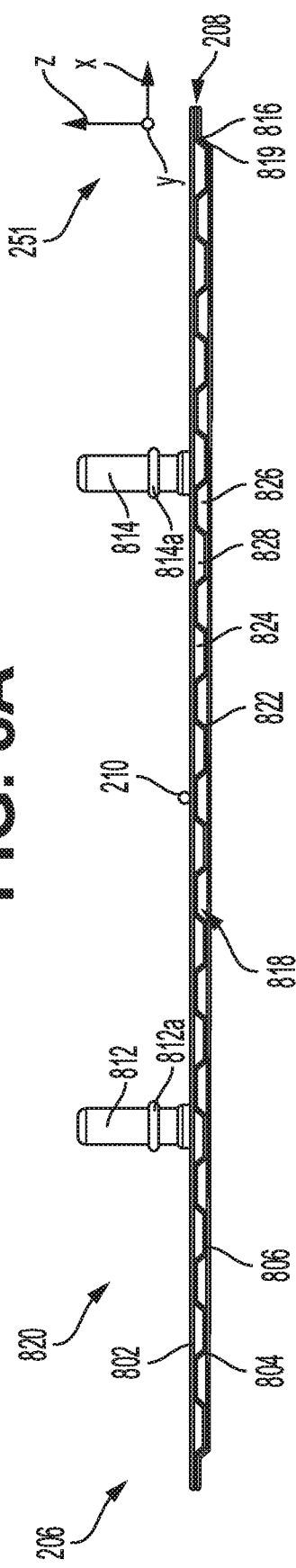

BATTERY COOLING UNIT INTERMEDIATE PLATE WITH CONTINUOUS AND DISCONTINUOUS RIBS

TECHNICAL FIELD

The present application relates to a heat exchanger in the form of a battery cooling unit that uses a plurality of cooling plates, including an intermediate plate with discontinuous and continuous ribs, and a heat exchanger fluid, such as coolant, to cool a battery of an electric vehicle.

BACKGROUND AND SUMMARY

Fully electric vehicles and hybrid electric vehicles may utilize a battery as a power source and one or more electric machines as a prime mover. The battery of a vehicle may be housed on the chassis of a vehicle while the inverters and transmission that deliver electrical power to an electric machine may be located on the axle. To maintain a temperature of a battery in a range to prevent degradation to and improve performance in the battery, a heat exchanger, such as a thermal modulator, may be used. Some battery thermal modulators, such as a battery cooling unit, may be double sided, where an intermediate plate separates a pair of outer plates, e.g., a top plate and a bottom plate, creating channels and cavities for heat exchanger fluid to flow through.

In order to create a double-sided battery thermal modulator with temperature uniformity on the top and bottom sides, both sides of the heat exchanger may be planar. Battery thermal modulators may have internal structure in order to route fluid (both to separate inlet/outlet streams, and to increase temperature uniformity) and resist internal/external pressure loading, where all internal fluid routing and structural support is accomplished by an internal plate, e.g. an intermediate plate. One way to achieve this is to have an intermediate plate that is stamped with ribs and brazed/soldered/welded/adhesively bonded between the two outer plates. However, a traditional ribbed plate has closed-end ribs, which means that a heat exchange medium does not flow underneath. Thus one or both sides of the battery thermal modulator may have "air pockets" between the intermediate plate and the outer plates. Air pockets may decrease the efficiency of heat transfer from the battery cells to the heat exchange medium by creating hot spots on the surfaces of the battery thermal modulator.

One previous solution is to internally turbulize, (e.g., to add structure/fluid routing to a 2-sided thermal modulator). However, turbulizers are normally rolled or stamped in one direction only. Areas where the heat exchange medium switches direction may thus have large gaps reducing cooling efficiency, or multiple pieces rolled/stamped in different directions may be needed in order to route the heat exchange medium and provide internal structure. Using multiple pieces, presents manufacturing challenges to accurately locate all of these pieces of turbulizers. Additionally, turbulizers may not sufficient reduce heat exchange medium short circuiting as many turbulizers may allow flow in both the longitudinal and lateral directions of the battery.

Another approach for double-sided cooling includes counter flow heat exchanger configurations. Double-sided cooling may create issues for some fluid routing situations. For example, the inlet and outlet heat exchange medium flows may be separated by the intermediate plate and only change directions at the ends of the coolers through holes in the intermediate plate. As such, it can be difficult to make the ribs discontinuous to locally enhance heat transfer through mixing of work fluid.

The inventor has recognized the above challenges and has developed various approaches to address them. In an example, the battery heat exchanger for a vehicle, comprises a first outer plate; a second outer plate positioned in parallel with the first outer plate; a fluid inlet; a fluid outlet; and an intermediate plate positioned between the first outer plate and the second outer plate. The intermediate plate may include a dividing rib to separate an inlet portion from an outlet portion of the heat exchanger, and a plurality of corrugations with openings for heat exchange medium flow, where the corrugations have different orientations and lengths.

Various examples of an intermediate plate, which may be positioned in the middle of the outer plates, are provided herein. These configurations allow for heat exchange medium to mix between discontinuous plates enhancing heat transfer and making a heat exchange medium more uniform in temperature. These configurations also allow for both sides of the intermediate plate to be wetted preventing the formation of air pockets and further enhancing heat transfer.

There may be multiple alternate embodiment intermediate plates with discontinuous ribs, wherein, the discontinuous ribs may be broken up into ribs of various sizes, shapes, and may have features such as side slots, apertures, and turbulence enhancing features. Additionally, there may be multiple alternative embodiments of intermediate plates with continuous ribs of various shapes.

It should be understood that the summary above is provided to introduce, in simplified form, a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 6B shows an isometric view of a section of the fifth example embodiment of a heat exchanger intermediate plate;

FIG. 6C shows side view of a cross section of a rib from the fifth example embodiment of a heat exchanger intermediate plate;

FIG. 6D shows side view of a cross section of a channel from the fifth example embodiment of a heat exchanger intermediate plate;

FIG. 8A an isometric view of an example of an assembled heat exchanger from a first isometric view;

FIG. 8B shows a side view of a cross section the assembled the heat exchanger of FIG. 8A;

DETAILED DESCRIPTION

Figure 1:
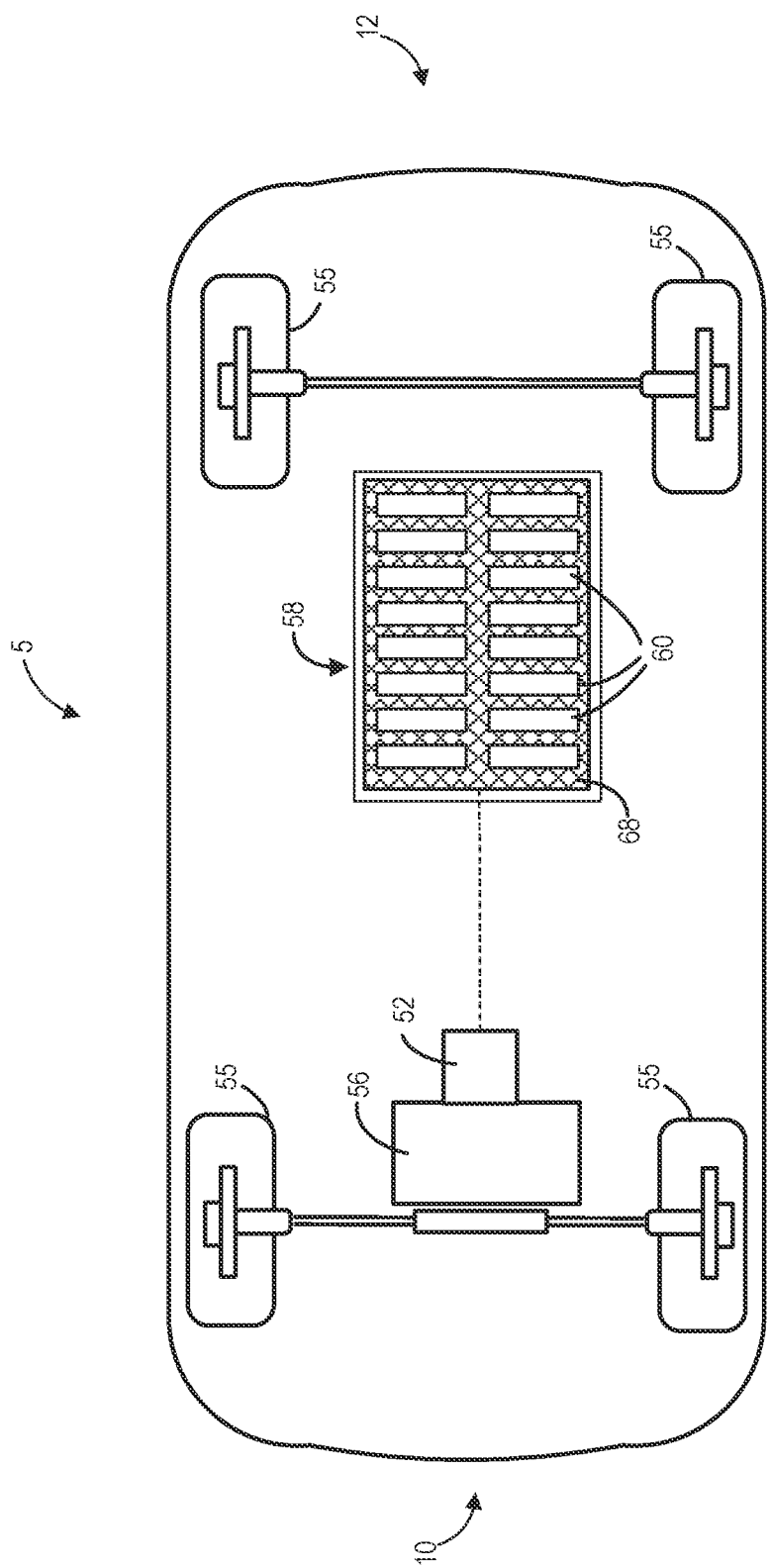
FIG. 1 shows an example schematic of an electrified vehicle drive train including a battery cooled or warmed by a heat exchanger.
Figure 2A:
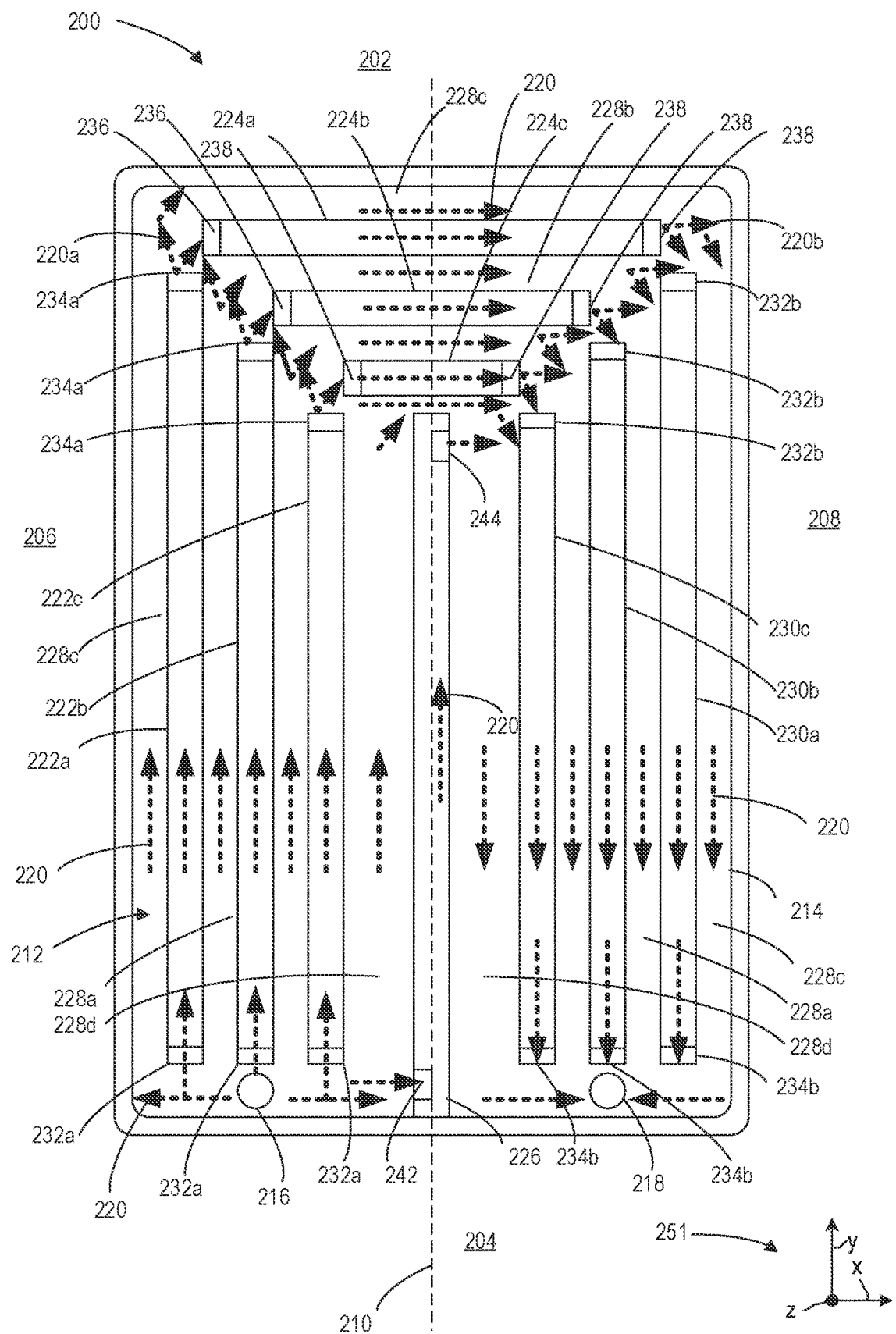
FIG. 2A shows a top view of a schematic of a first example embodiment of a heat exchanger intermediate plate.
Figure 2B:
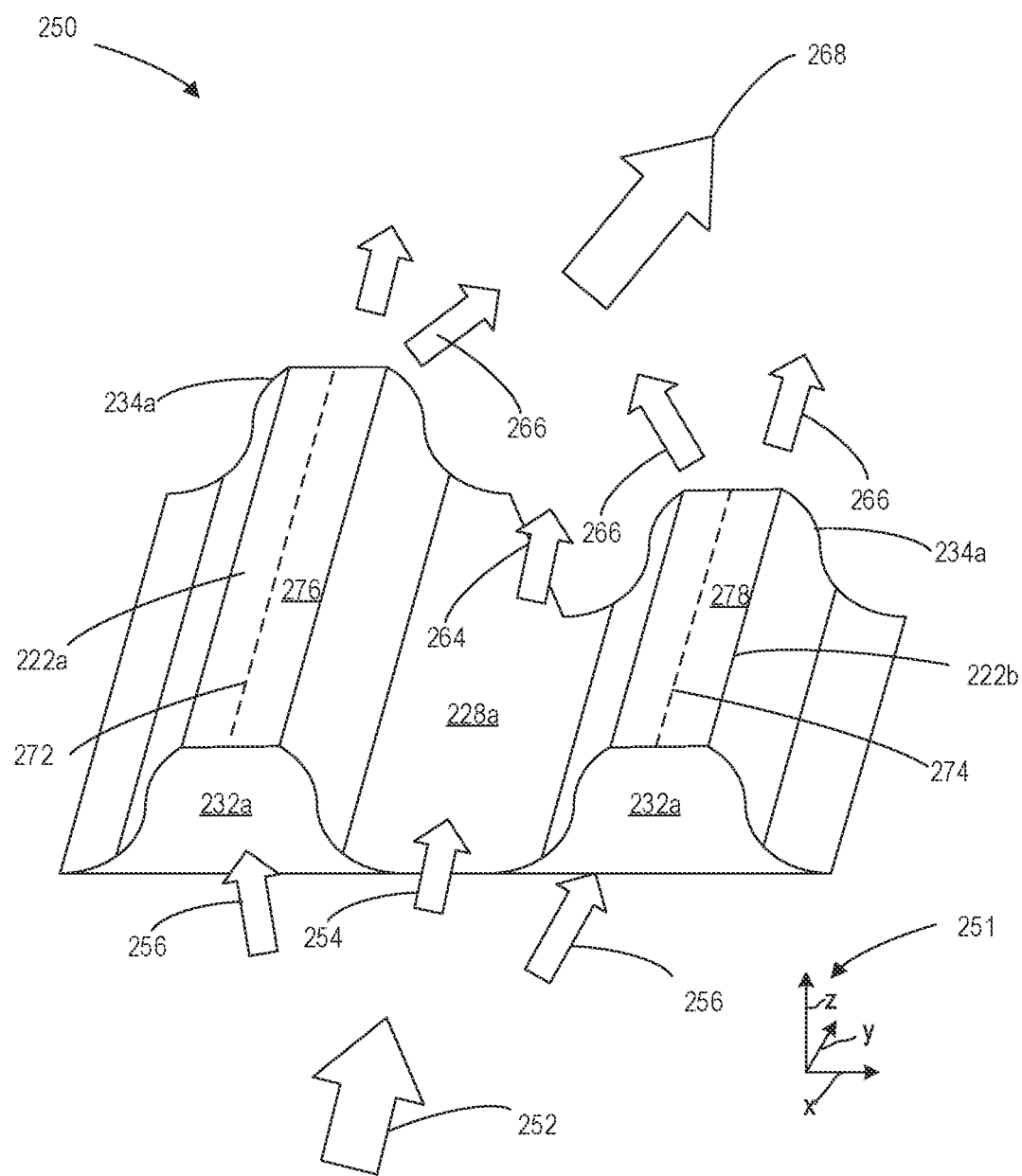
FIG. 2B shows an isometric view of a section of the first example embodiment of a heat exchanger intermediate plate.
Figure 3A:
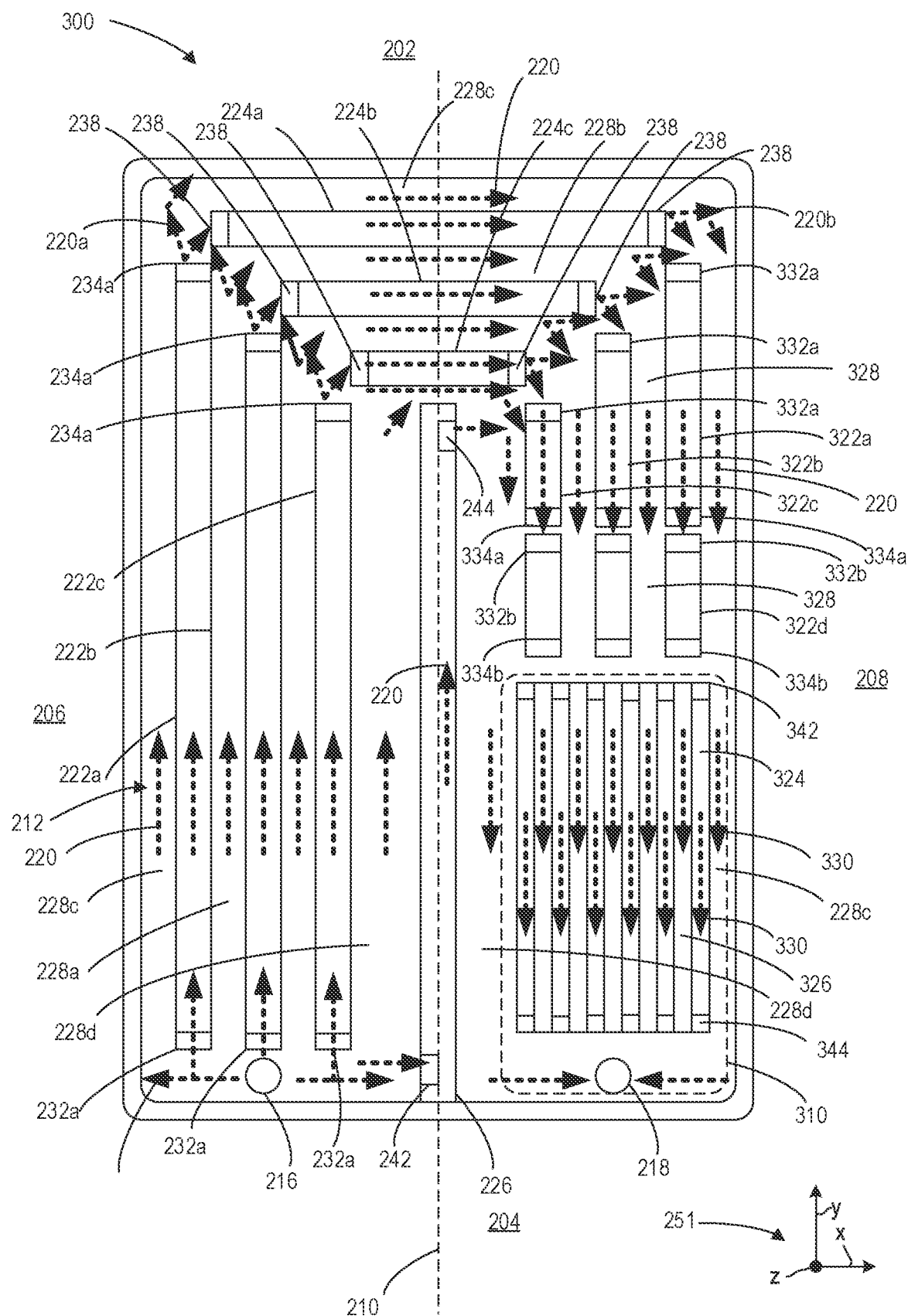
FIG. 3A shows a top view of a schematic of a second example embodiment of a heat exchanger intermediate plate.

The following description relates to systems and methods for a heat exchange medium based battery cooling plate. The heat exchange medium may be a gas or a liquid, or combinations thereof. An example of a vehicle configured with an electrified vehicle drive train system, including a battery cooled or warmed in a process of thermal modulation by a thermal modulator is shown in FIG. 1. FIG. 2A-7 show schematics of different example embodiments of intermediate plates designed to fit between outer plates and promote heat transfer to a heat exchange medium, such as coolant. FIG. 2A-2B show a schematic of an example of a first embodiment and features of an intermediate plate referred to herein as an intermediate plate. The intermediate plate of FIG. 2A-2B includes channels and ribs that impose restrictions on the heat exchange medium. FIG. 3A-7 show additional example schematics of embodiments of intermediate plates with different features and components. The outlet side of the intermediate plate schematic in FIG. 3A-3B has two sets of shorter discontinuous ribs and a more numerous set of thinner discontinuous ribs to increase surface area for heat transfer. In FIG. 4A-4B the ribs have with a plurality of side slots for coolant or another thermal exchange medium to enter and exit. The channels and ribs of FIG. 5A-5B have a set of apertures to aid in heat transfer against the outer plates. Similarly, the ribs and channels of FIG. 6A-6D may including delta features to aid in heat transfer. FIGS. 6C-6D show how the delta features affect the flow of coolant or another thermal exchange medium to promote increased heat transfer from a side view. The lateral and longitudinal ribs are straight in FIG. 2A-6D. In contrast in FIG. 7 the lateral and longitudinal ribs are sinusoidal in shape with a plurality of curves to increase the surface area.

Figure 3B:
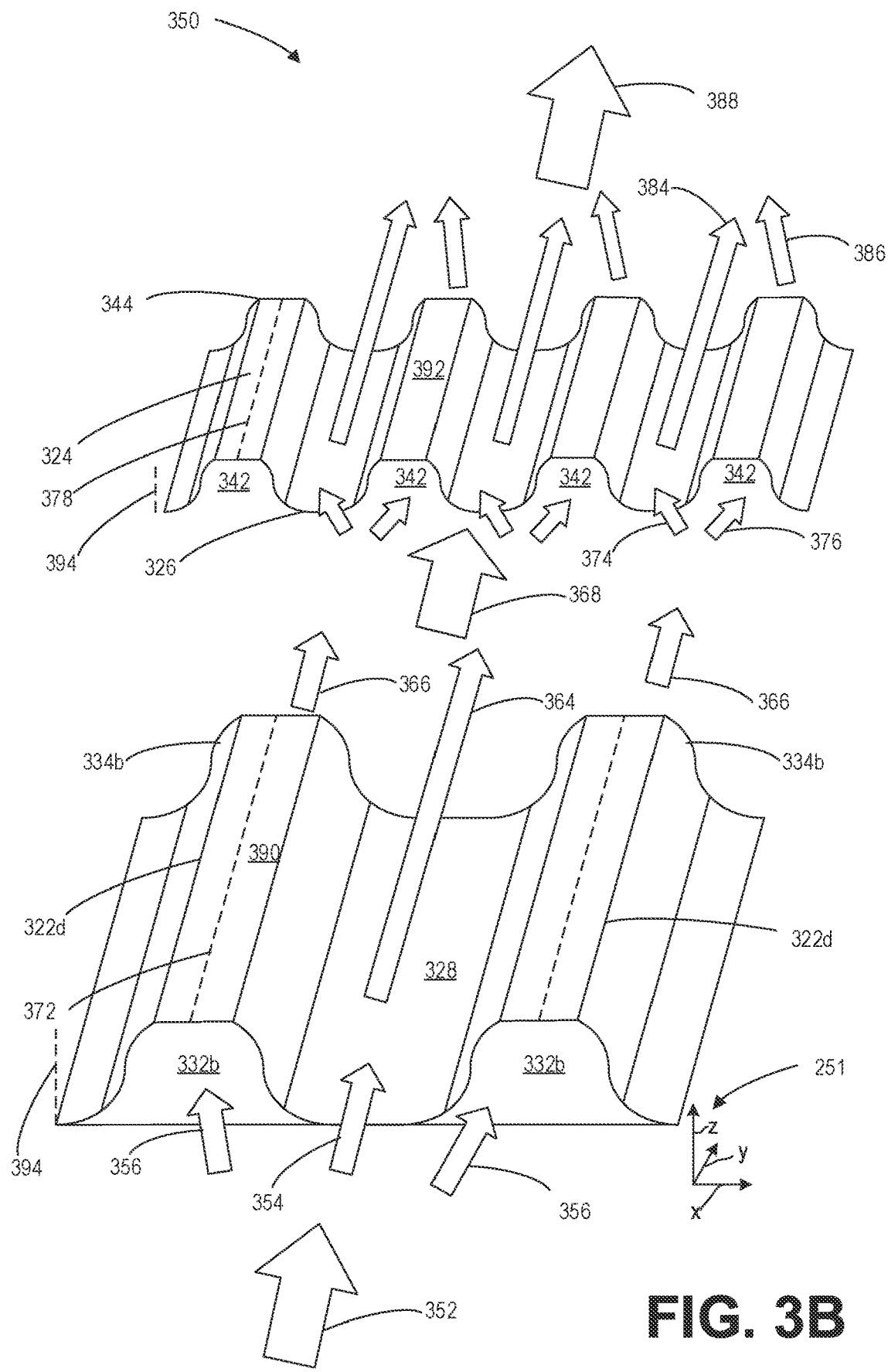
FIG. 3B shows an isometric view of a section of the second example embodiment of a heat exchanger intermediate plate.
Figure 4A:
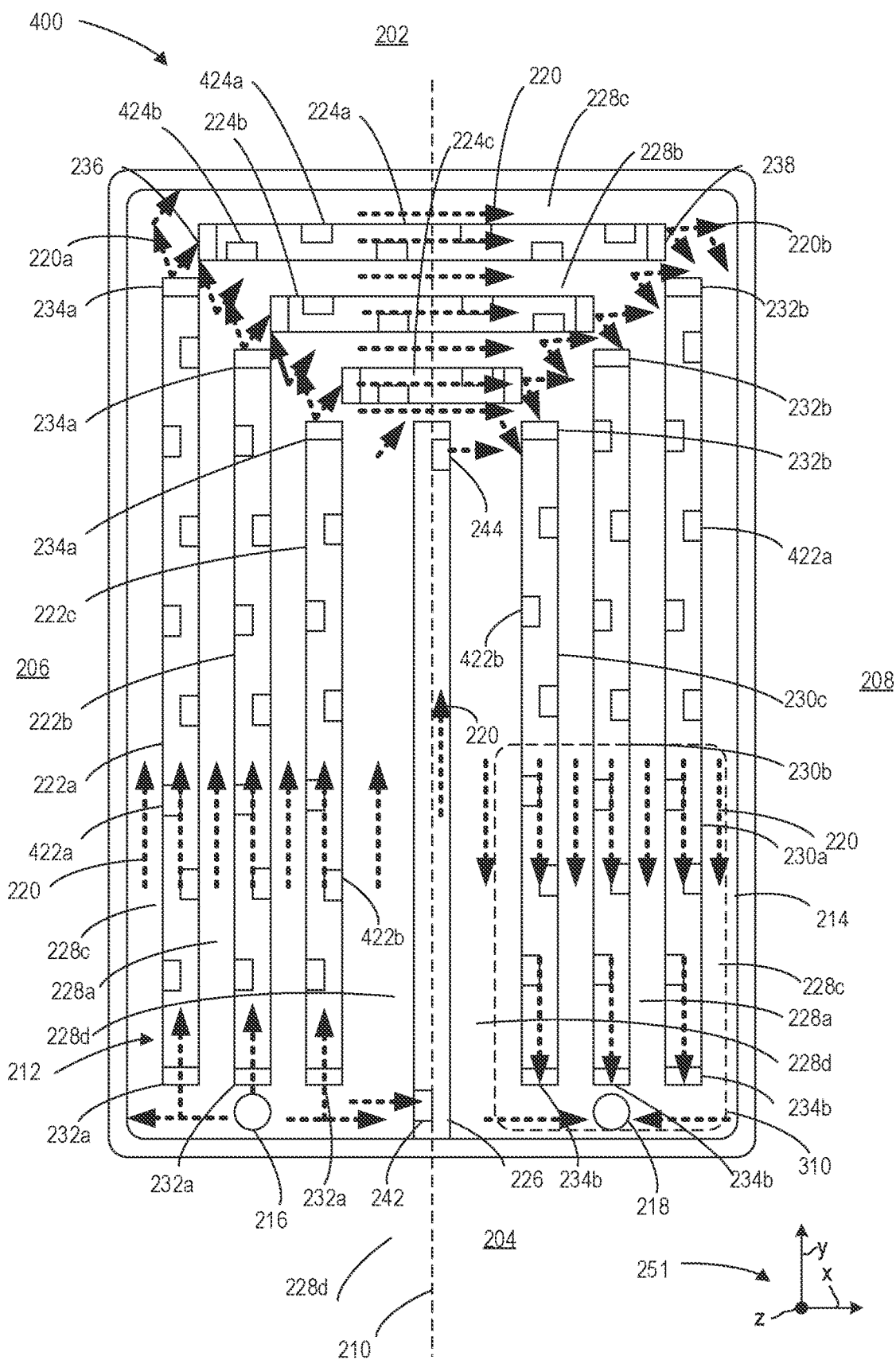
FIG. 4A shows a top view of a schematic of a third example embodiment of a heat exchanger intermediate plate.
Figure 4B:
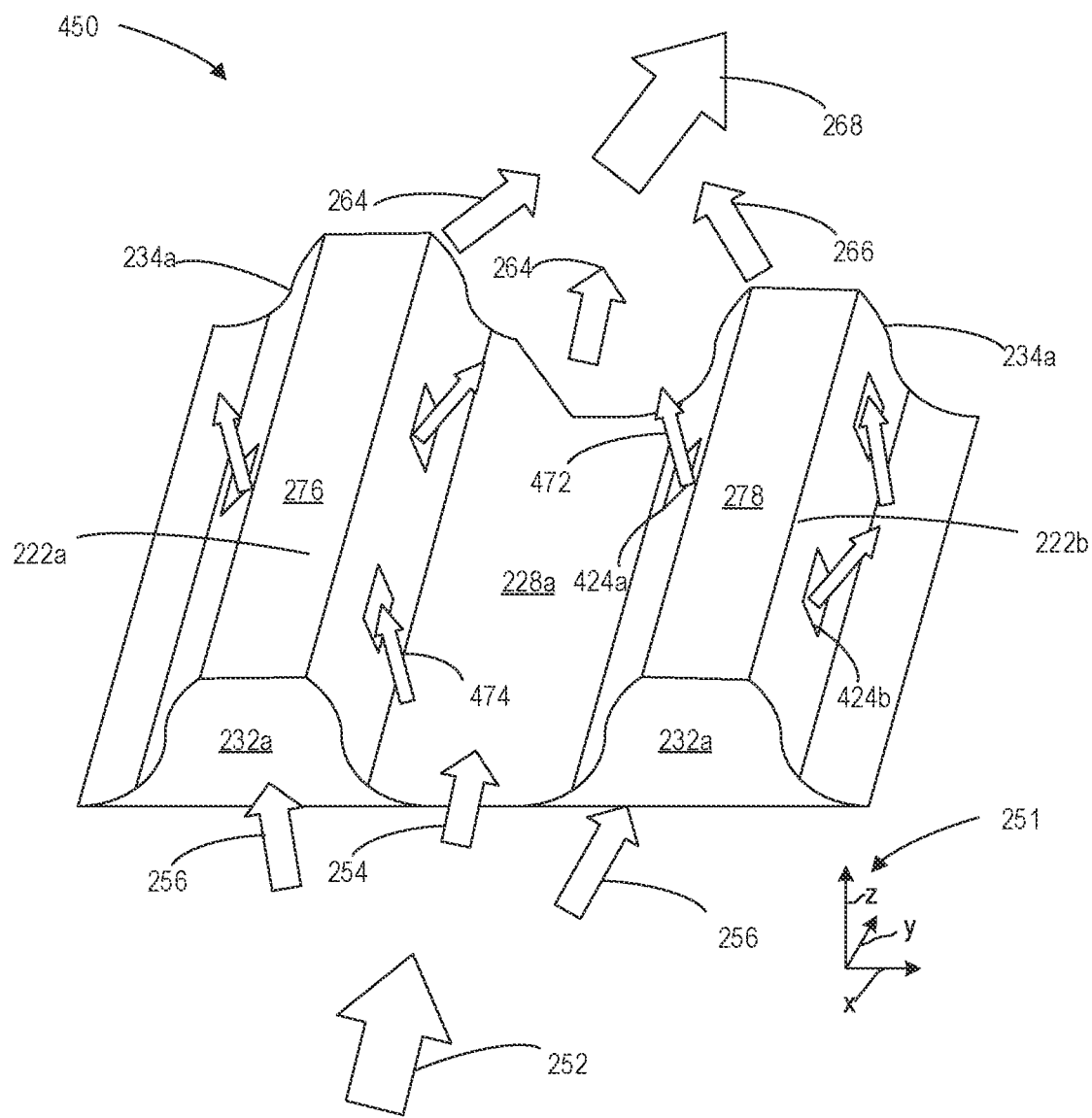
FIG. 4B shows an isometric view of a section of the third example embodiment of a heat exchanger intermediate plate.

FIGS. 2B, 3B, 4B, 5B, and 6B shows the flow path of a thermal exchange medium from an isometric perspective through longitudinal ribs and channels and how they are effected by features of each embodiment. FIG. 3B shows the flow path of a thermal exchange medium from an isometric perspective through longitudinal ribs and channels and through a thinner set of longitudinal discontinuous ribs.

Figure 8C:
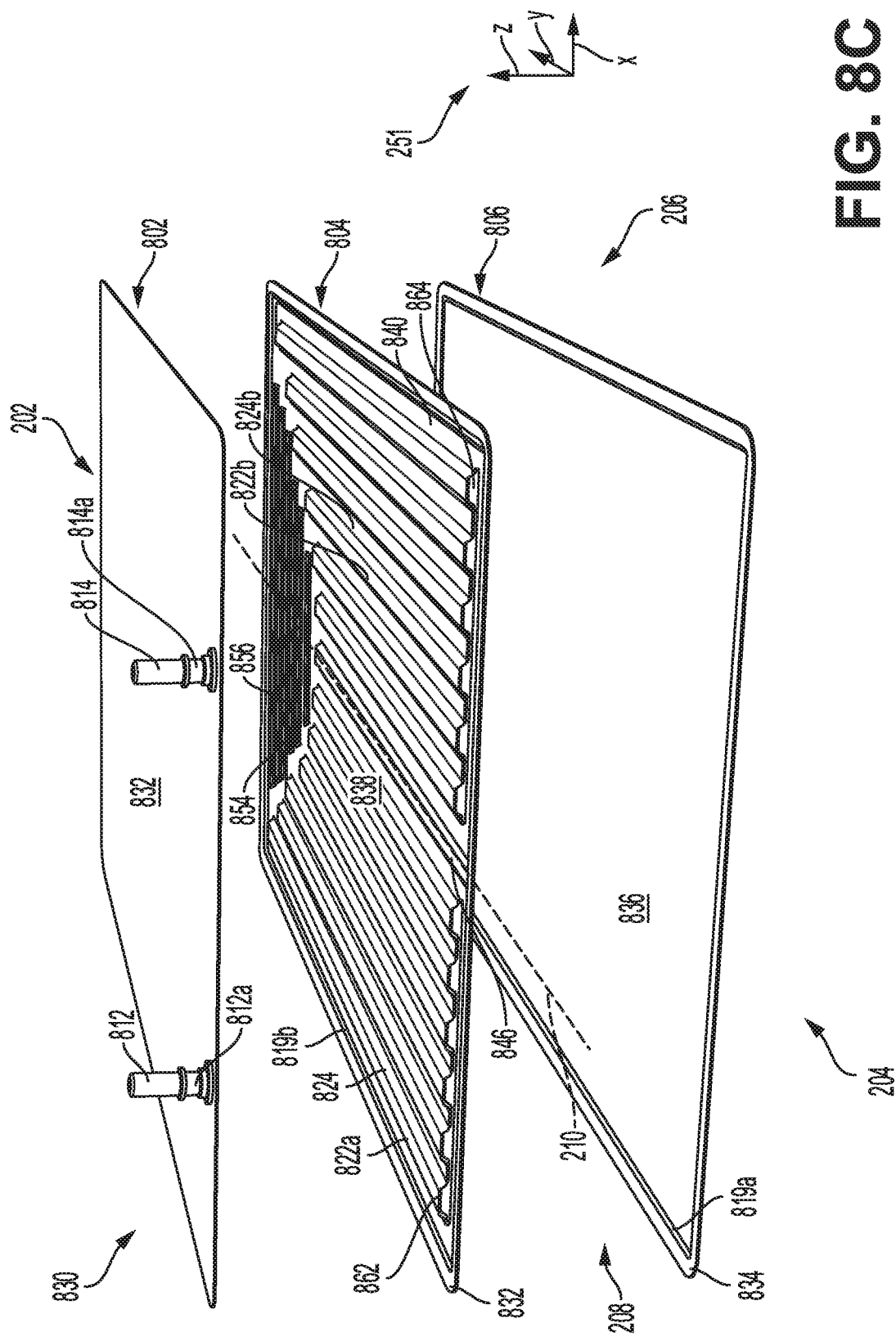
FIG. 8C show an exploded view of the example heat exchanger from FIG. 8A-8B.
Figure 9A:
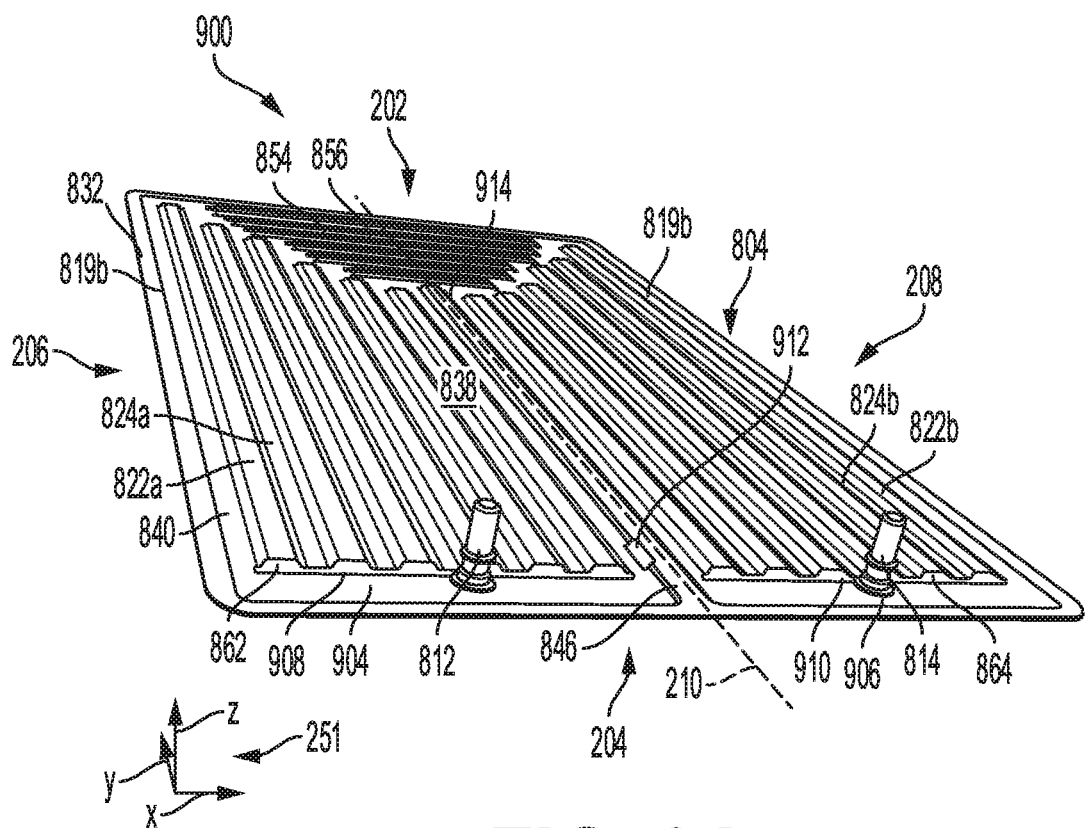
FIG. 9A shows an example of a first embodiment of an intermediate plate from a first isometric view.
Figure 9B:
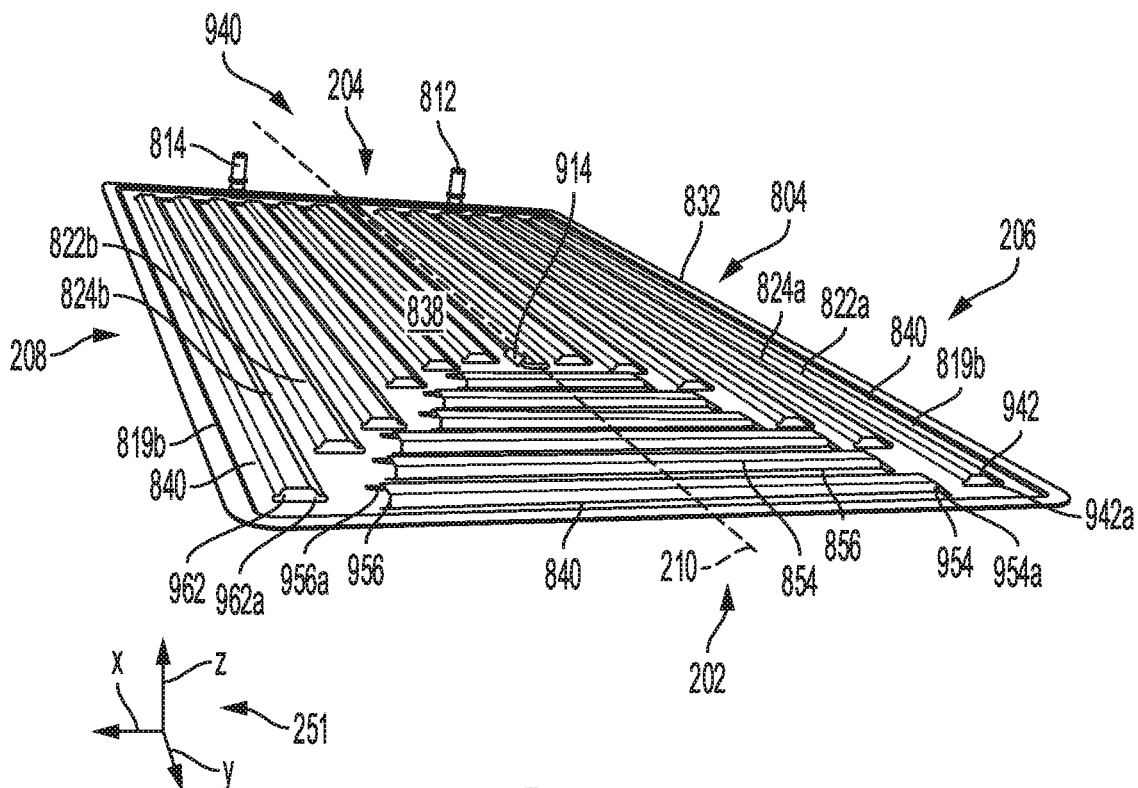
FIG. 9B shows an example of a first embodiment of an intermediate plate from a second isometric view.

FIG. 8A-8C show a heat exchanger for cooling a battery from a plurality of perspectives. In FIG. 8A the heat exchanger is shown from an isometric perspective, while in FIG. 8B the interior of the heat exchanger is shown from the side looking into a cutout. FIG. 8C shows an exploded view of and the plates that form the heat exchanger. An example intermediate plate is shown in FIG. 9A and FIG. 9B from a first and second isometric view, respectively.

FIGS. 1-7 show schematics of example configurations with relative positioning of the various components. In FIG. 1-7 the schematics are examples that may be non-limiting, wherein features such as the number of discontinuous ribs, channels, side slots, apertures, and delta features may be more or less numerous than shown. FIG. 8A-9B show example configurations with approximate position. FIGS. 8A-9B are shown approximately to scale, though other relative dimensions may be used. As used herein, the terms "approximately" is construed to mean plus or minus five percent of the range unless otherwise specified.

If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 1, an example vehicle 5 is shown with several interior components. In one example, vehicle 5 may be a hybrid electric vehicle (HEV) with multiple sources of torque available to one or more vehicle wheels 55, e.g., torque may be provided mechanically by an engine or electrically from an energy storage device such as a battery 58. As such, the battery 58 may be a traction battery 58. In other examples, vehicle 5 may be an all-electric vehicle (EV), powered exclusively by the battery 58. Vehicle 5 further includes an electric machine 52 which may be a motor or a motor/generator, for example a traction motor for driving wheels of the vehicle. Electric machine 52 receives electrical power from the battery 58 which is converted to rotational energy, e.g., torque, which may be multiplied or reduced at a transmission 56. The torque is delivered to two or more of the vehicle wheels 55. Electric machine 52 may also be operated as a generator to provide electrical power to charge battery 58, e.g., during a braking operation.

While electric machine 52 is shown providing rotational energy to the vehicle wheels 55 proximate to a front end 10 of vehicle 5, e.g., front wheels of the vehicle, via the transmission 56, it will be appreciated that the transmission 56 may be alternatively arranged at rear wheels of vehicle 5, e.g., vehicle wheels 55 proximate to a rear end 12 of vehicle 5. When coupled to the rear wheels, energy from the electric machine 52 may be transmitted thereto. Furthermore, in other examples, each of the front wheels and the rear wheels may be coupled to individual transmission, such as when vehicle 5 is configured with all-wheel drive.

In the depicted example, the battery 58 may be installed in a rear region of the vehicle, e.g., proximate to the rear end 12 of the vehicle 5. In one example, the battery 58 may be positioned below rear passenger seats of the vehicle. In other examples, the battery 58 may be located in a floor of a rear compartment of the vehicle or may be integrated into a vehicle chassis, forming a floor of vehicle 5. The battery 58 may include a plurality of cells 60, the plurality of cells 60 are electrically coupled to one another. Examples of battery types which may be used in vehicle 5 include lithium-ion, lithium polymer, lead-acid, nickel-cadmium, and nick-metal hydride batteries, amongst others.

Battery performance and longevity may be affected by temperature, and a range of operating temperatures for battery operation may be narrow. During battery charge/discharge, internal resistances of battery components may drive an increase in battery temperature. In addition, chemical reactions occurring within each of the plurality of cells 60 may be exothermic.

Heat extraction from the battery 58 may be enabled by implementation of a heat exchanger in the form of a battery heat exchanger 68, as shown in FIG. 1, which may help maintain the battery temperature within the range of desired operating temperatures, for example. The battery heat exchanger 68 may be referred to as a battery cooler. The heat exchanger 68 may maintain temperature of a battery in a temperature range via cooling, but in certain instances may be used to maintain or increase the temperature of a battery via warming. In other examples, the heat exchanger 68 may be incorporated in a battery module or a battery pack to provide cooling to other regions of a battery assembly (where the battery assembly includes the battery 58). The heat exchanger 68 may be comprised of a plurality of plates. The heat exchanger 68 may conduct heat from the battery 58 via direct contact between the outer plates of the heat exchanger 68 and bottom faces of each of the plurality of cells 60 of the battery 58. For one example, the heat exchanger may be positioned above or below the battery 58 to maintain the temperature of the battery 58 and adjacent components. For another example heat exchanger 68 may also act as an ICE plate, and be positioned between the cells of battery 58, therein maintaining the temperature of the battery 58 using both outer plates of the heat exchanger 68. In the example of FIG. 1, heat exchanger 68 is positioned longitudinally offset to a rear of the vehicle and laterally centered in the vehicle.

In one example, the heat exchanger 68 may be a heat exchanger formed of two outer plates, and an intermediate plate as described herein. The intermediate plate may be a liquid channel cooling plate configured with a fluid passage having a plurality of ribs and channels to flow thermal exchange medium there through, thereby providing cooling of the battery 58.

FIGS. 2A-9B illustrate various example configurations with different intermediate plates. A set of reference axes 251 is provided for comparison between views, indicating a y-axis, an x-axis, and a z-axis consistent with FIG. 1. The z-axis may be parallel with a direction of gravity (e.g., a vertical direction) and perpendicular to both the y-axis and the x-axis; the x-axis is parallel with a horizontal direction (e.g., lateral direction of the vehicle), with the y-axis is parallel with a longitudinal direction of the vehicle. When referencing direction, positive may refer to in the direction of the arrow of the y-axis, x-axis, and z-axis and negative may refer to in the opposite direction of the arrow of the y-axis, x-axis, and z-axis. Arrows that extend toward (e.g., negative to) a view are represented by a circular dot. Arrows that extend away from (e.g., negative to) a view are represented by a circular ring.

FIG. 2A shows a top view of a schematic example of an intermediate plate schematic 200 of a first embodiment. The intermediate plate 200 may be the intermediate plate of the heat exchanger 68 of FIG. 1.

The intermediate plate 200 may have a set of sides, a first side 202, a second side 204, an inlet side 206, and an outlet side 208. The first side 202 may be located in a positive direction of the y-axis from the intermediate plate 200. The second side 204 may be located in a negative direction of the y-axis from the intermediate plate 200. For an example, the first side 202 may be closest to the front end 10 and the second side 204 may be closest the rear end 12 of the vehicle 5 in the example embodiment of intermediate plate 200. However, it is to be appreciated the position of first side 202, second side 204, inlet side 206, and outlet side 208 are non-limiting and other positioning relative to the vehicle 5 or a similar vehicle.

The inlet side 206 and the outlet side 208 may be divided by a longitudinal axis 210 located on the longitudinal center of the plate 200 that may be approximately parallel with the y-axis. The longitudinal axis 210 which may also be the longitudinal axis of the vehicle. The longitudinal axis 210 may divide the intermediate plate 200 into two approximately symmetrical halves. The first side 202, the second side 204, the inlet side 206, the outlet side 208, and the longitudinal axis 210 may be present and positioned relative to other schematics of intermediate plates shown in in FIG. 3B-6 similarly to intermediate plate 200. Additionally, the first side 202, the second side 204, the inlet side 206, the outlet side 208, and the longitudinal axis 210 may be present and positioned similarly to intermediate plate 200 relative to a heat exchanger, such as heat exchanger 68, including the top plates, bottom plates, and intermediate plates of FIG. 8A-9B. With respect to the longitudinal axis 210, features described as longitudinal may be approximately parallel to the longitudinal axis 210 and features described as lateral may be approximately perpendicular to the longitudinal axis 210.

The intermediate plate 200 may have a plate depression 212 circumferentially surrounded by a set of plate walls 214. Depression 212 may receive and contain a thermal exchange medium and thus form a thermal exchange medium channel. Portions of the walls 214 may act as a coupling surface for the intermediate plate 200 to couple with the outer plates. When coupled to a top plate, the walls 214 may create a fluid and air tight seal for the depression 212 and thermal exchange medium from the exterior surrounding the heat exchanger 68.

The intermediate plate 200 has an inlet region 216 located nearer to the inlet side 206 and an outlet region 218 located nearer to the outlet side 208. For example, the inlet region 216 and outlet region 218 may also be located on the edge of the intermediate plate 200 closer to the second side 204 compared to the first side 202. The inlet region 216 may be located below an inlet and the outlet region 218 may be located below an outlet on the top plate. A thermal exchange medium may enter the intermediate plate 200 through the inlet region 216 and may exit the intermediate plate 200 through the outlet region 218.

From the inlet region 216, the thermal exchange medium may be driven through regions of the depression 212 into a plurality of channels and ribs. The ribs may be hollow with an inlet and an outlet opening at ends of the ribs allowing for thermal exchange medium to travel underneath and be enclosed by the walls and surfaces of the rib. The fluid flow through the channels and ribs allows for similar wetting of both the top surface and bottom surface of the intermediate plate 200, respectively. Likewise, similar wetting may occur in examples schematics of intermediate plate 300, intermediate plate 400, intermediate plate 500, intermediate plate 600, and intermediate plate 700 of FIGS. 3A-7. Similar wetting may also occur in intermediate plate 804 and 900 of FIGS. 8B-9B.

The plurality of corrugations may be straight (e.g., approximately linear) for intermediate plate 200. The plurality of straight corrugations formed of intermediate plate 200 may form into a plurality of ribs and channels. There may be various types of ribs that are discontinuous ribs or continuous ribs. Discontinuous ribs have an inlet and/or outlet before a directional change, allowing the thermal exchange medium to partially mix before changing direction. Continuous ribs may change the direction of the thermal exchange medium while inside the continuous rib without the thermal exchange medium entering or exiting through an opening in the rib. Both the discontinuous and continuous ribs may be formed by stamping, forming, or machining the intermediate plate, such as intermediate plate 200.

The ribs and channels allow for thermal exchange medium fluid to wet the top and bottom surface of intermediate plate 200. Additionally, ribs and channels allow for thermal exchange medium fluid interact and exchange heat with the outer plates that may enclose an intermediate plate 200.

For the example of intermediate plate 200, it includes three longitudinal discontinuous ribs on the inlet side 206, three longitudinal discontinuous ribs on the outlet side 208, and three lateral discontinuous ribs bridging the inlet side 206 and outlet side 208. However, it is to be appreciated that the number of discontinuous ribs is non-limiting, and other examples similar to intermediate plate 200 may have greater or fewer ribs.

A plurality of thermal exchange medium flow paths 220 may be represented by arrows throughout the ribs, channels, and other features of the intermediate plate 200. The thermal exchange medium flow paths 220 may start from the inlet region 216 distributing thermal exchange medium to the inlet side 206 of the intermediate plate 200. The thermal exchange medium flow paths 220 may travel longitudinally toward the first side 202 of intermediate plate 200. Near the first side 202 of the inlet side 206 the thermal exchange medium flow paths 220 may be forced to turn toward the outlet side 208 by the plate walls 214 and features of the depression, such as the ribs and channels. Near the first side 202 of the outlet side 208 the thermal exchange medium flow paths 220 may be forced to turn toward the second side 204 by the plate walls 214 and features of the depression, such as the ribs and channels. The thermal exchange medium flow paths 220 may travel longitudinally toward the second side 204 on the outlet side 208. The thermal exchange medium flow paths 220 may then leave the ribs and channels of the outlet side 208 and exit the intermediate plate 200 through the outlet region 218.

In an example, an overall U-shaped thermal exchange medium path is formed with a plurality of nested U-shaped paths formed via a plurality of ribs and channels, such as illustrated in FIG. 2A, for example. The channels and ribs that form the U-shaped thermal exchange medium paths may be referred to as a plurality of U-shaped thermal exchange medium channels and U-shaped thermal exchange medium ribs. A U-shaped thermal exchange medium channel may also be referred to as a U-shaped flow channel. The legs of the U-shape flow alternate on opposite side of the intermediate plate.

On the inlet side 206 is a first inlet longitudinal discontinuous rib 222a, a second inlet longitudinal discontinuous rib 222b, and a third inlet longitudinal discontinuous rib 222c that are approximately parallel, longitudinal with respect to the longitudinal axis 210, and discontinuous. On the outlet side 208 is a first outlet longitudinal discontinuous rib 230a, a second outlet longitudinal discontinuous rib 230b, and a third outlet longitudinal discontinuous rib 230c are approximately parallel, longitudinal with respect to the longitudinal axis 210, and discontinuous.

Nominally collinear with the longitudinal axis 210 is a dividing rib 226, separating the intermediate plate into an inlet portion closest to the inlet side 206 from an outlet portion closest to the outlet side 208. The dividing rib 226 prevents a single or a plurality of thermal exchange medium flow paths 220 from forming laterally between the inlet region 216 and outlet region 218.

A first lateral discontinuous rib 224a, a second lateral discontinuous rib 224b, a third lateral discontinuous rib 224c are located between above the dividing rib 226 near the first side 202 and extend from the inlet side 206 to the outlet side 208. The first lateral discontinuous rib 224a, second lateral discontinuous rib 224b, and third lateral discontinuous rib 224c are approximately parallel, lateral with respect to the longitudinal axis 210, and discontinuous.

For one example, the first, second, and third inlet longitudinal discontinuous ribs 222a, 222b, 222c; the first, second, and third outlet longitudinal discontinuous ribs 230a, 230b, 230c; and dividing rib 226 may be parallel with the y-axis. For this example, the first, second, and third lateral discontinuous ribs 224a, 224b, 224c may extend approximately parallel with the x-axis.

A plurality of channels is located in the depression 212 and formed between continuous ribs, discontinuous ribs and other features of the depression 212. A plurality of longitudinal channels 228a that are approximately linear may be formed between the first, second, and third inlet longitudinal discontinuous ribs 222a, 222b, 222c and the first, second, and third outlet longitudinal discontinuous ribs 230a, 230b, 230c. Likewise, a plurality of lateral channels 228b that are approximately linear may be formed between the first, second, and third lateral discontinuous ribs 224a, 224b, 224c. An outer channel 228c may surround the continuous and discontinuous ribs with the perimeter of the plate depression 212. And dividing channels 228d are formed on the inlet side 206 and outlet side 208 of the dividing rib 226. The dividing channels 228d may be formed from the dividing rib 226 and the third inlet longitudinal discontinuous rib 222c or the third outlet longitudinal discontinuous rib 230c.

Thermal exchange medium flow paths 220 show thermal exchange medium fluid may flow from the second side 204 to the first side 202 of the intermediate plate 200 through the first, second, and third inlet longitudinal discontinuous ribs 222a, 222b, 222c and dividing rib 226. The thermal exchange medium flow paths 220 show that thermal exchange medium fluid may flow from the inlet side 206 to the outlet side 208 of the intermediate plate 200 through the first, second, and third lateral discontinuous ribs 224a, 224b, 224c and the dividing rib 226. The thermal exchange medium flow paths 220 show thermal exchange medium fluid may flow from the first side 202 to the second side 204 of intermediate plate 200 through the first, second, and third outlet longitudinal discontinuous ribs 230a, 230b, 230c.

Thermal exchange medium flow paths 220 show the thermal exchange medium fluid may flow through the longitudinal channels 228a, the lateral channels 228b, the outer channel 228c, and the dividing channels 228d. Thermal exchange medium flow paths 220 show thermal exchange medium fluid may flow from the second side 204 to the first side 202 through the longitudinal channels 228a, the outer channel 228c, and the dividing channels 228d on the inlet side 206. Thermal exchange medium flow paths 220 show thermal exchange medium fluid may flow from the inlet side 206 to the outlet side 208 through the lateral channels 228b and the outer channel 228c. Thermal exchange medium flow paths 220 show thermal exchange medium fluid may flow from the first side 202 to the second side 204 through the longitudinal channels 228a, the outer channel 228c, and the dividing channels 228d on the outlet side 208.

The thermal exchange medium flow paths 220 form a U-shape, e.g., a U-shaped thermal exchange medium path. Collectively the longitudinal channels 228a, the lateral channels 228b, the outer channel 228c and the dividing channels 228d shape the U-shaped path of the thermal exchange medium flow paths 220, and may form a plurality of U-shaped flow channels. The longitudinal channels 228a may form legs on the inlet side 206 and outlet side 208 for the plurality of U-shaped flow channels. Each leg of the U-shaped flow channel alternates sides of the intermediate plate 200. The discontinuous ribs, e.g., the first, second, and third inlet longitudinal discontinuous ribs 222a, 222b, 222c; the first, second, and third lateral discontinuous ribs 224a, 224b, 224c; and the first, second, and third outlet longitudinal discontinuous ribs 230a, 230b, 230c; may form the U-shaped thermal exchange medium ribs.

The first, second, and third inlet longitudinal discontinuous ribs 222a, 222b, 222c and the first, second, and third outlet longitudinal discontinuous ribs 230a, 230b, 230c decrease in length with respect to the longitudinal axis and y-axis closer to the dividing rib 226. For example, the first inlet longitudinal discontinuous rib 222a is closest to a wall 214 on the inlet side 206, furthest from the dividing rib 226, and greatest in longitudinal length, e.g. with respect to the y-axis, compared to the second and third inlet longitudinal discontinuous ribs 222b, 222c. For this example, the third inlet longitudinal discontinuous rib 222c is furthest from a wall 214 on the inlet side 206, closest to the dividing rib 226, and smaller in longitudinal length compared to the first and second inlet longitudinal discontinuous ribs 222a, 222b. Likewise, for another example, the first outlet longitudinal discontinuous rib 230a is closest to a wall 214 on the outlet side 208, furthest from the dividing rib 226, and greatest in longitudinal length, e.g. with respect to the y-axis, compared to the second and third outlet longitudinal discontinuous ribs 230b, 230c. For this example, the third outlet longitudinal discontinuous rib 230c is furthest from a wall 214 on the outlet side 208, closest to the dividing rib 226, and smaller in longitudinal length compared to the first and second outlet longitudinal discontinuous ribs 230a, 230b. The first, second, and third inlet longitudinal discontinuous ribs 222a, 222b, 222c and the first, second, and third outlet longitudinal discontinuous ribs 230a, 230b, 230c are approximately the same width laterally, e.g., with respect to the x-axis.

The difference in length of discontinuous ribs may help angle and guide thermal exchange medium flow paths 220 towards the next set of discontinuous ribs as seen through a plurality of first exit flow paths 220a and a plurality of second exit flow paths 220b. For example, the plurality of first exit flow paths 220a may leave the first, second, and third inlet longitudinal discontinuous ribs 222a, 222b, 222c; the longitudinal channels 228a; the outer channel 228c; and the dividing channels 228d on the inlet side 206. For this example, the difference in length of the first, second, and third inlet longitudinal discontinuous ribs 222a, 222b, 222c may partially guide the plurality of first exit flow paths 220a toward and into the first, second, and third lateral discontinuous ribs 224a, 224b, 224c; lateral channels 228b; and/or the outer channel 228c near the first side 202. For this example, the second exit flow paths 220b may be affected in a similar way between the first, second, and third lateral discontinuous ribs 224a, 224b, 224c and the first, second, and third outlet longitudinal discontinuous ribs 230a, 230b, 230c.

The first, second, and third lateral discontinuous ribs 224a, 224b, 224c decrease in length laterally—e.g., with respect to the x-axis, as they approach the second side 204 of the intermediate plate 200. For example, in the intermediate plate 200 the first lateral discontinuous rib 224a is longer (e.g., with respect to the x-axis) compared to the second lateral discontinuous rib 224b that is located closer to the second side 204 (e.g., with respect to the y-axis). The first, second, and third lateral discontinuous ribs 224a, 224b, 224c are approximately the same width longitudinally, e.g., with respect to the y-axis.

Each discontinuous rib has a first opening and a second opening formed by respective cut-outs in the sheet metal. The thermal exchange medium flow paths 220 shows thermal exchange medium fluid flow into the first, second, and/or third inlet longitudinal discontinuous ribs 222a, 222b, 222c through a plurality of first openings 232a and exit through a plurality of second openings 234a. A first opening 232a may act as an inlet into and the second opening 234a may act as an outlet from the first, second, and/or third inlet longitudinal discontinuous ribs 222a, 222b, 222c. Similarly, thermal exchange medium flow paths 220 show thermal exchange medium fluid may flow into the first, second, and/or third outlet longitudinal discontinuous ribs 230a, 230b, 230c through a plurality of first openings 232b and exit through a plurality of second openings 234b. Thermal exchange medium flow paths 220 show that thermal exchange medium may enter the first, second, and/or third lateral discontinuous ribs 224a, 224b, 224c through a plurality of first openings 236 and exit through a plurality of second openings 238. The shape of the first openings 232a, 232b, 236 may be non-limiting and dependent on the shape of the discontinuous ribs. The shape of the second openings 234a, 234b, 238 may be non-limiting and dependent on the shape of the discontinuous ribs.

Likewise, the dividing rib 226 has a first dividing rib opening 242 and a second dividing rib opening 244, wherein thermal exchange medium fluid may enter the dividing rib 226 through the first dividing rib opening 242 and exit through the second dividing rib opening 244. For one example, the shape of the first dividing rib opening 242 and the second dividing rib opening 244 may be approximately rectangular. For another example, the first dividing rib opening 242 and the second dividing rib opening 244 may have curved corners. However, it is to be appreciated that the shape of the first dividing rib opening 242 and the second dividing rib opening 244 may be non-limiting, and other shapes have been contemplated.

The dividing rib 226 may prevent a single or a plurality of thermal exchange medium flow paths 220 from forming laterally between the inlet region 216 and outlet region 218. A thermal exchange medium flow path 220 travels around the dividing rib 226 via the channels and discontinuous ribs, or travel through the longitudinal length of the dividing rib 226 via the first dividing rib opening 242 and second dividing rib opening 244.

Thermal exchange medium fluid in ribs, such as the first, second, and third inlet longitudinal discontinuous ribs 222a, 222b, 222c and the dividing rib 226, may wet a bottom plate and prevent air pockets from forming between a bottom plate and the intermediate plate 200. Likewise, thermal exchange medium fluid in channels, such as for example longitudinal channels 228a, may wet and prevent air pocket from forming between a top plate and the intermediate plate 200. The interaction between an intermediate plate and a top and bottom plate may be explored in greater detail in FIG. 8A-8C. Air pockets between an intermediate plate, e.g., the intermediate plate 200, intermediate plate 300, intermediate plate 400, intermediate plate 500, intermediate plate 600 and intermediate plate 700, and outer plates, e.g., a top and bottom, may reduce the efficiency of heat transfer for a heat exchanger, such as heat exchanger 68. The discontinuous ribs, such as the first, second, and third inlet longitudinal discontinuous ribs 222a, 222b, 222c, and channels, such as longitudinal channels 228a, may allow for thermal exchange medium fluid heated by a bottom plate and a top plate to mix. The mixing of thermal exchange medium fluid may create a thermal exchange medium fluid more uniform in temperature with respect to the z-axis, enhance heat transfer, and prevent the formation of air pockets.

In an example, thermal exchange medium fluid may enter the intermediate plate through the inlet region 216 and a substantial portion may be directed toward the first side 202 by the first, second, and third inlet longitudinal discontinuous ribs 222a, 222b, 222c, and the longitudinal channels 228a, the portions of the outer channel 228c, and the dividing channel 228d on the inlet side. Some thermal exchange medium fluid may be directed into the first dividing rib opening 242 of the dividing rib 226. The thermal exchange medium fluid may combine after exiting the longitudinal channels 228a on the inlet side 206 and the second openings 234a of the first, second, and third inlet longitudinal discontinuous ribs 222a, 222b, 222c. The thermal exchange medium fluid may then be forced by the plate walls 214 and dividing rib 226 to change direction. The thermal exchange medium fluid may then be directed from the inlet side 206 to the outlet side 208 by first, second, and third lateral discontinuous ribs 224a, 224b, 224c, and the lateral channels 228b and the portions of the outer channel 228c. The thermal exchange medium fluid may recombine after exiting the lateral channels 228b and the second openings 238 of the first, second, and third lateral discontinuous ribs 224a, 224b, 224c. The thermal exchange medium fluid may be directed toward the second side 204 and outlet region 218 by the first, second, and third outlet longitudinal discontinuous ribs 230a, 230b, 230c, and the longitudinal channels 228a, the portions of the outer channel 228c, and the dividing channel 228d on the outlet side 208. The thermal exchange medium fluid traveling through the dividing rib 226 may exit through the second dividing rib opening 244 and combined with the thermal exchange medium fluid traveling through the dividing channel 228d on the outlet side 208. The thermal exchange medium fluid may combine after exiting the longitudinal channels 228a, the outer channel 228c, and the dividing channels 228d on the outlet side 208 and the second openings 234b of the first, second, and third outlet longitudinal discontinuous ribs 230a, 230b, 230c. After combining, the thermal exchange medium fluid may then exit the intermediate plate through the outlet region 218.

Turning to FIG. 2B, a rib schematic 250 of the first and second inlet longitudinal discontinuous ribs 222a, 222b and a longitudinal channel 228a are shown from an isometric perspective.

Thermal exchange medium fluid may flow toward the first and second inlet longitudinal discontinuous ribs 222a, 222b and the longitudinal channel 228a through an inlet flow 252. The features of the first and second inlet longitudinal discontinuous ribs 222a, 222b and the longitudinal channel 228a may divide the inlet flow 252 into an inlet channel flow 254 and an inlet rib flow 256. For the example in FIG. 2B the inlet channel flow 254 may travel through the longitudinal channel 228a. For the example in FIG. 2B the inlet rib flow 256 may enter through first openings 232a and travel through the first and second inlet longitudinal discontinuous ribs 222a, 222b. The inlet flow 252, the inlet channel flow 254, and inlet rib flow 256 may be components of the thermal exchange medium flow paths 220.

Thermal exchange medium fluid may exit the longitudinal channel 228a through outlet channel flow 264. Likewise, thermal exchange medium fluid may exit the first and second inlet longitudinal discontinuous ribs 222a, 222b through outlet rib flow 266. Thermal exchange medium fluid may then form or partially form into the outlet flow 268. The mixing of thermal exchange medium fluid from the outlet channel flow 264 and the outlet rib flow 266 into an outlet flow 268 may enhance heat transfer by making the thermal exchange medium fluid more uniform in temperature before being sent into other channels and discontinuous ribs. The outlet channel flow 264 and outlet rib flow 266 may be components of the first exit flow paths 220a.

The first inlet longitudinal discontinuous rib 222a is a first distance 272 that is greater than a second distance 274 of the second inlet longitudinal discontinuous rib 222b. The second opening 234a and first opening 232a of the first inlet longitudinal discontinuous rib 222a is the first distance 272 apart that is greater than the second distance 274 between the second opening 234a and first opening 232a of the second inlet longitudinal discontinuous rib 222b. The difference in the first distance 272 and the second distance 274 influences the outlet flow 268 to turn toward the outlet side 208.

The first inlet longitudinal discontinuous rib 222a has a top surface 276 and the second inlet longitudinal discontinuous rib 222b has a top surface 278. The top surfaces 276, 278 may be approximately flat and abut a top plate. Similarly, the third inlet longitudinal discontinuous rib 222c may have a top surface that is approximately flat to abut a top plate. Likewise, first, second, and third lateral discontinuous ribs 224a, 224b, 224c; the first, second, and third outlet longitudinal discontinuous ribs 230a, 230b, 230c; and the dividing rib 226 may have a top surface that is approximately flat to abut a top plate.

It is to be appreciated, that FIG. 2B is a simplified example, and flow paths may enter other ribs and channels not shown in rib schematic 250, such as the third inlet longitudinal discontinuous rib 222c and dividing channel 228d. may travel through the first and second ribs.

It is noted that many of the components between FIGS. 3A-7 are similar to those shown in FIGS. 2A-2B. Thus, such components have been labeled similarly and may not be re-introduced.

Turning to FIG. 3A shows a top view of a schematic example of an intermediate plate of a second embodiment referred to herein as intermediate plate schematic 300. The intermediate plate schematic 300 may also be referred to herein as intermediate plate 300. The intermediate plate 300 may be the intermediate plate of a heat exchanger, such as the heat exchanger 68.

The intermediate plate 300 shares many features of the intermediate plate 200, such as the features on the inlet side 206, the dividing rib 226, and the first, second, and third lateral discontinuous ribs 224a, 224b, 224c.

The outlet side 208 of intermediate plate 300 has a dense heat transfer region 310 designed to maximize surface area and locally increase heat transfer. The thermal exchange medium fluid as it nears the outlet increases in temperature and may be at its highest temperature near the outlet region 218. Thermal energy may be transferred at a slower rate the closer a temperature of a thermal exchange medium fluid is to the temperature of a substance or material being cooled, such as battery 58. To increase the exchange of thermal energy at a similar or adequate rate to the coolant, the dense heat transfer region 310 has an increased surface area.

Outside the dense heat transfer region 310, the outlet side 208 of the intermediate plate 300 has ribs that are discontinuous and approximately parallel with the longitudinal axis 210 in the form of a first short longitudinal rib 322a, a second short longitudinal rib 322b, a third short longitudinal rib 322c, and a plurality of fourth short longitudinal ribs 322d. The short longitudinal ribs 322a, 322b, 322c, 322d function similarly to the first, second, and third outlet longitudinal discontinuous ribs 230a, 230b, 230c but are shorter in length longitudinally, e.g., with respect to the y-axis. The first, second, and third short longitudinal ribs 322a, 322b, 322c may be the same width laterally, e.g., with respect to the x-axis, and decrease in length with respect to the longitudinal axis and y-axis closer when located closer to the dividing rib 226. The first short longitudinal rib 322a is closest laterally, e.g., with respect to the x-axis, to the walls 214 and greatest in longitudinal length, e.g. with respect to the y-axis, compared to the second and third short longitudinal ribs 322b, 322c. Likewise, the third short longitudinal rib 322c is closest laterally, e.g., with respect to the x-axis, to the dividing rib 226 and least in longitudinal length, e.g., with respect to the y-axis, compared to the first and second short longitudinal ribs 322a, 322b. The fourth short longitudinal ribs 322d are the same length longitudinally, e.g., with respect to the y-axis and width laterally with respect to the x-axis. A plurality of longitudinal channels 328 may form between the short longitudinal ribs 322a, 322b, 322c, 322d and be longitudinal and approximately parallel with the y-axis.

In dense heat transfer region 310, there are a plurality of thin longitudinal discontinuous ribs 324 and thin longitudinal channels 326. The thin longitudinal discontinuous ribs 324 are shorter in width, e.g., with respect the x-axis, and more numerous than the short longitudinal ribs 322a, 322b, 322c, 322d. The thin longitudinal channels 326 are shorter in width, e.g., with respect the x-axis, and more numerous than the longitudinal channels 228a, 328. The thin longitudinal discontinuous ribs 324 and thin longitudinal channels 326 are more numerous compared to the short longitudinal ribs 322a, 322b, 322c, 322d and the longitudinal channels 228a, 328 giving the dense heat transfer region 310 a higher surface area. The higher surface area of the dense heat transfer region 310 may increase the heat transfer coefficient (e.g., H1), and therein may increase the rate of heat transfer the dense heat transfer region 310.

The thermal exchange medium flow paths may be sub divided into thin thermal exchange medium flow paths 330 by the thin longitudinal discontinuous ribs 324 and thin longitudinal channels 326. The thin thermal exchange medium flow paths 330 may be of a smaller volumetric flow rate per thin longitudinal discontinuous rib 324 or thin longitudinal channel 326 compared to the thermal exchange medium flow paths 220 in the first, second, third, and fourth short longitudinal ribs 322a, 322b, 322c, 322d and the longitudinal channels 328.

Thermal exchange medium fluid may enter the first, second, and third short longitudinal ribs 322a, 322b, 322c through a plurality of first openings 332a and may exit through a plurality of second openings 334a. Thermal exchange medium fluid may enter the fourth inlet short longitudinal ribs 322d through a plurality of first openings 332b and may exit through a plurality of second openings 334b. For example, thermal exchange medium fluid may enter the first openings 332a of the first, second, and third short longitudinal ribs 322a, 322b, 322c from the first, second, and third lateral discontinuous ribs 224a, 224b, 224c and outer channel 228c. The thermal exchange medium fluid may exit the first, second, and third short longitudinal ribs 322a, 322b, 322c through the second openings 334a and enter the first openings 332b of the fourth short longitudinal ribs 322d.

Thermal exchange medium fluid may enter the thin longitudinal discontinuous ribs 324 through a plurality of first thin openings 342 and may exit through a plurality of second thin openings 344. For example, thermal exchange medium fluid may leave the outlet of the fourth short longitudinal ribs 322d through the second openings 334b and enter the thin longitudinal discontinuous ribs 324 through a plurality of first thin openings 342. For this example, the thermal exchange medium fluid may exit the thin longitudinal discontinuous ribs 324 through a plurality of second thin openings 344 and leave the intermediate plate 300 through the outlet region 218. The flow of thermal exchange medium fluid from the fourth short longitudinal ribs 322d to and through the thin longitudinal discontinuous ribs 324, may be explored in greater detail in FIG. 3B.

Turning to FIG. 3B, is a rib schematic 350 of a pair of fourth short longitudinal ribs 322d, a longitudinal channel 328, a plurality of thin longitudinal discontinuous ribs 324, and a plurality of thin longitudinal channels 326 shown from an isometric perspective.

Thermal exchange medium fluid may flow toward the fourth short longitudinal ribs 322d and the longitudinal channel 328 through an inlet flow 352. The fourth short longitudinal ribs 322d may be of a length of a first distance 372. The features of the fourth short longitudinal ribs 322d and the longitudinal channel 328 may divide the inlet flow 352 into an inlet channel flow 354 and an inlet rib flow 356. For the example in FIG. 3B the inlet channel flow 354 may travel through the longitudinal channel 328. Likewise, for this example, the inlet rib flow 356 may enter through the first openings 332b and travel through the fourth short longitudinal ribs 322d. The inlet flow 352, inlet channel flow 354, inlet rib flow 356 may be components of a thermal exchange medium flow path 220.

Thermal exchange medium fluid may exit the longitudinal channel 328 through an intermediate channel flow 364. Likewise, thermal exchange medium fluid may exit the fourth short longitudinal ribs 322d through an intermediate rib flow 366. The intermediate channel flow 364 and the intermediate rib flow 366 may combine into an intermediate flow 368. The mixing of the intermediate channel flow 364 and the intermediate rib flow 366 into the intermediate flow 368 may enhance heat transfer by making the thermal exchange medium fluid more uniform in temperature before being sent into other channels and discontinuous ribs.

The intermediate flow 368 may be further divided into a plurality of thin inlet channel flows 374 and a thin inlet rib flows 376 by the features of the thin longitudinal discontinuous ribs 324, such as the first thin openings 342, and the thin longitudinal channels 326. The thin longitudinal channels may be of a length of a second distance 378. The thin inlet channel flows 374 may enter the thin longitudinal channels 326 while the thin inlet rib flows 376 may enter the thin longitudinal discontinuous ribs 324. A thin outlet channel flow 384 may exit the thin longitudinal channels 326 and a thin outlet rib flow 386 may exit the thin longitudinal discontinuous ribs 324. Thermal exchange medium fluid in the thin outlet channel flow 384 and the thin longitudinal discontinuous ribs 324 may combine into an outlet flow 388 before exiting the intermediate plate 300 through the outlet region 218. The thin inlet channel flows 374, thin inlet rib flows 376, thin outlet channel flow 384, thin outlet rib flow 386 may be components of the thin thermal exchange medium flow paths 330.

The fourth short longitudinal ribs 322d may have a top surface 390 that is approximately flat, (e.g., approximately coplanar with a plane formed by the x and y axes). Likewise, the thin longitudinal discontinuous ribs 324 may have a top surface 392 that is approximately flat, (e.g., approximately coplanar with a plane formed by the x and y axes). The fourth short longitudinal ribs 322d and the thin longitudinal discontinuous ribs 324 may be of heights that are approximately similar at a distance 394. The top surface 390 and top surface 392 may abut a top plate.

Turning to FIG. 4A shows a top view of a schematic example of an intermediate plate of a third embodiment referred to herein as an intermediate plate schematic 400. The intermediate plate schematic 400 may also be referred to herein as intermediate plate 400. The intermediate plate 400 may be the intermediate plate of a heat exchanger, such as the heat exchanger 68.

The intermediate plate 400 shares many features of the intermediate plate 200, such as the features on the inlet side 206, the dividing rib 226, and the first, second, and third lateral discontinuous ribs 224a, 224b, 224c.

The intermediate plate 400 has a plurality of slots that are apertures in the side of the discontinuous ribs allowing for thermal exchange medium fluid to travel between the discontinuous ribs and the channels. For example, the slots of FIG. 4A may be approximately rectangular in shape.

A plurality of first longitudinal slots 422a and second longitudinal slots 422b may be located on the sides of first, second, and third inlet longitudinal discontinuous ribs 222a, 222b, 222c and the first, second, and third outlet longitudinal discontinuous ribs 230a, 230b, 230c. For this example, there may be a plurality of first and second longitudinal slots 422a, 422b, but the number of slots per rib is non-limiting. For intermediate plate 400 and similar embodiments there may be at least one of the first longitudinal slots 422a and the second longitudinal slots 422b for each of the first, second, and third inlet longitudinal discontinuous ribs 222a, 222b, 222c and the first, second, and third outlet longitudinal discontinuous ribs 230a, 230b, 230c. The first longitudinal slots 422a located on the side of a rib closest to the walls 214 (e.g., facing toward the walls 214) of the intermediate plate 400. The second longitudinal slots 422b may be on the side of a rib closet to the dividing rib 226 (e.g., facing away from the walls 214) of the intermediate plate 400.

Likewise, a plurality of first lateral slots 424a and a second lateral slots 424b may be located on the first, second, and third lateral discontinuous ribs 224a, 224b, 224c. For this example, there may be a plurality of first and second lateral slots 424a, 424b, but the number of slots per rib is non-limiting. For intermediate plate 400 and similar embodiments there may be at least one of first lateral slots 424a and one of the second lateral slots 424b for each of the first, second, and third lateral discontinuous ribs 224a, 224b, 224c. For the example shown in FIG. 4A, the first lateral slots 424a located on the side of a rib facing closest to the first side 202 of the intermediate plate 400. For this example, the second lateral slots 424b may be on the side of a rib closest to the second side 204.

Turning to FIG. 4B, a rib schematic 450 of first and second inlet longitudinal discontinuous ribs 222a, 222b and a longitudinal channel 228a are shown from an isometric perspective.

In addition to the first openings 232a and second openings 234a, fluid may enter or exit the first and/or second longitudinal slots 422a, 422b through side outflow path 472 and side inflow path 474. Side outflow path 472 may transport thermal exchange medium fluid from the interior of the first or second inlet longitudinal discontinuous ribs 222a, 222b to the longitudinal channel 228a via the first and/or second longitudinal slots 422a, 422b. Likewise, side inflow path 474 may transport thermal exchange medium fluid from either the longitudinal channel 228a to the interior of either the first or second inlet longitudinal discontinuous ribs 222a, 222b via the first and/or second longitudinal slots 422a, 422b.

It is to be appreciated, that FIG. 4B is a simplified example, and flow paths may enter or exit other ribs with the first and second longitudinal slots 422a, 422b, such as the third inlet longitudinal discontinuous rib 222c. It is also to be appreciated, that thermal exchange medium fluid may also be exchanged between the first, second, and third outlet longitudinal discontinuous ribs 230a, 230b, 230c via first and second longitudinal slots 422a, 422b in a similar manner to the example described above. It is also to be appreciated, that thermal exchange medium fluid may also be exchanged between the first, second, and third lateral discontinuous ribs 224a, 224b, 224c and the lateral channels 228b via first and second lateral slots 424a, 424b in a similar manner to the example described above. Flow paths may enter or exit other channels, such as the outer channel 228c via the first longitudinal slots 422a and first lateral slots 424a as well as the dividing channel 228d via the second longitudinal slots 422b.

Figure 5A:
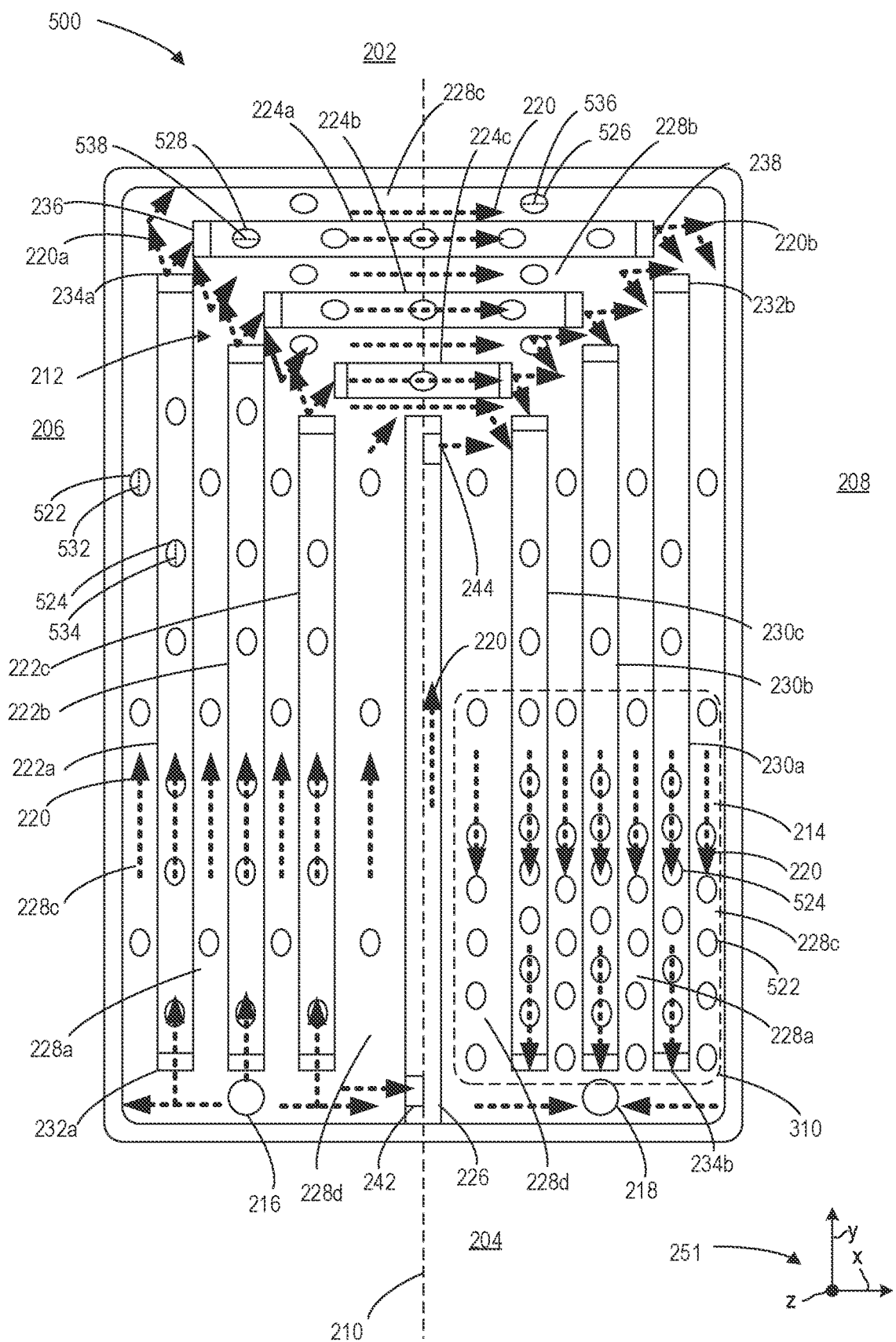
FIG. 5A shows a top view of a schematic of a fourth example embodiment of a heat exchanger intermediate plate.
Figure 6A:
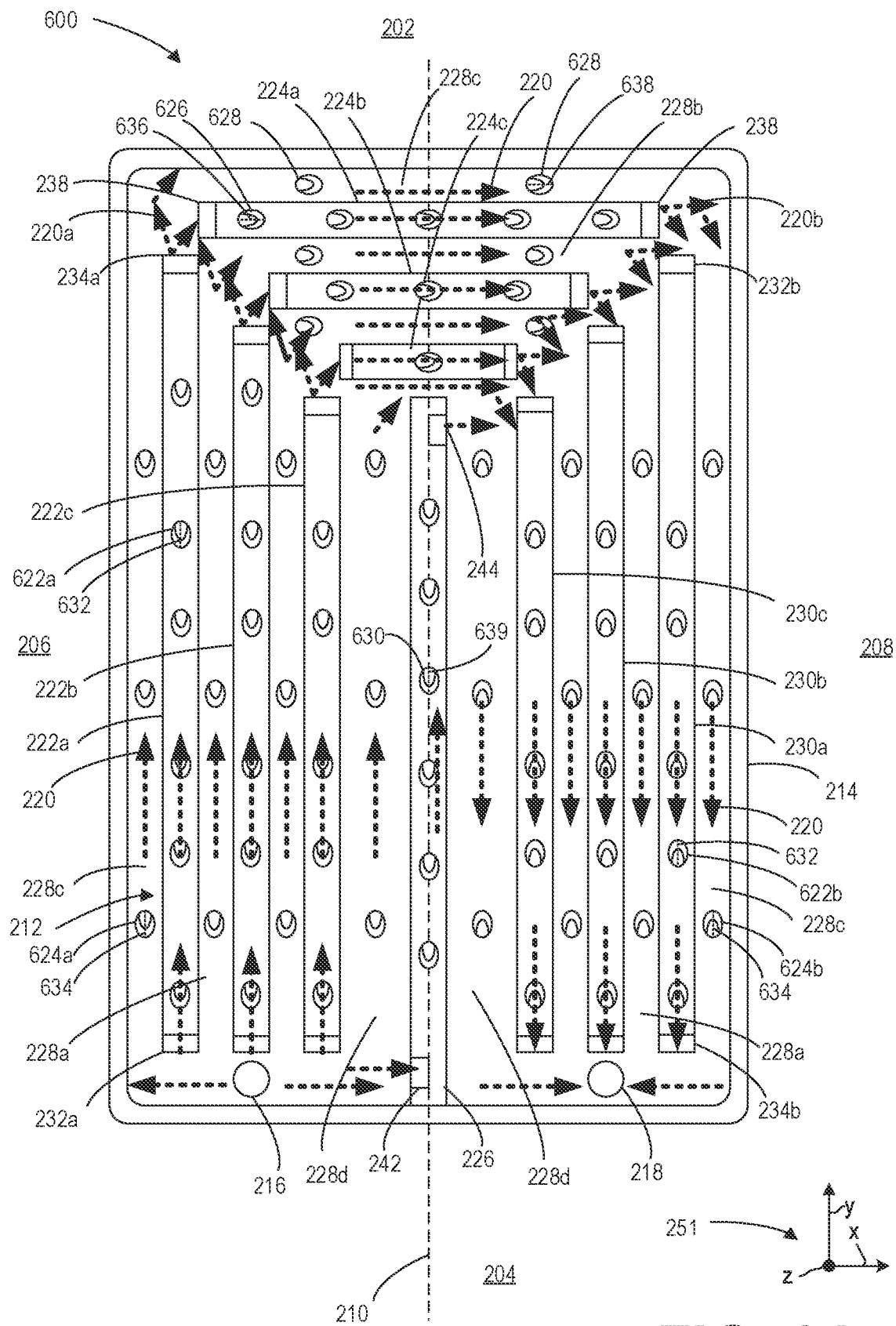
FIG. 6A shows a top view of a schematic of fifth example embodiment of a heat exchanger intermediate plate.

Turning to FIG. 5A shows a top view of a schematic example of an intermediate plate of a fourth embodiment referred to as intermediate plate schematic 500. The intermediate plate schematic 500 may also be referred to herein as an intermediate plate 500. The intermediate plate 500 may be the intermediate plate of a heat exchanger, such as the heat exchanger 68.

The intermediate plate 500 shares many features of the intermediate plate 200, such as the features on the inlet side 206, the dividing rib 226, and the first, second, and third lateral discontinuous ribs 224a, 224b, 224c.

The intermediate plate 500 has a plurality of apertures located on the upward facing surfaces of the discontinuous ribs and the channels. The purpose of these apertures would be to both locally enhance heat transfer through boundary layer break up. Additionally, the apertures may improve manufacturability by helping with to form the intermediate plate 500 and also ensuring good braze between the intermediate plate and outer plates. A lack of braze between the intermediate plate and outer plates may have a negative effect on heat transfer. For the intermediate plate 500 there may be four types of apertures: longitudinal channel apertures 522, longitudinal rib apertures 524, lateral channel apertures 526, and lateral rib apertures 528.

For example, each of the longitudinal channel apertures 522, longitudinal rib apertures 524, lateral channel apertures 526, and lateral rib apertures 528 may be approximately similar in shape. However, it is to be appreciated that the lengths, sizes, and shapes of the of the longitudinal channel apertures 522, longitudinal rib apertures 524, lateral channel apertures 526, and lateral rib apertures 528 may vary between example plates and with one another in other examples. Additionally, it is to be appreciated lengths, sizes, and shapes of the each of the longitudinal channel apertures 522, longitudinal rib apertures 524, lateral channel apertures 526, and lateral rib apertures 528 are non-uniform and may vary with one another. Additionally, it is to be appreciated that the density (e.g., the quantity of per region) of the longitudinal channel apertures 522, longitudinal rib apertures 524, lateral channel apertures 526, and lateral rib apertures 528 may vary between regions of an intermediate plate 500.

The longitudinal channel apertures 522 are located on the top facing surfaces of the longitudinal channels 228a, the dividing channels 228d, and portions of the outer channel 228c that are approximately parallel with the longitudinal axis 210 of intermediate plate 500. The longitudinal channel apertures 522 may be of a first length 532. The longitudinal rib apertures 524 may be located on the top facing surfaces of the first, second, and third inlet longitudinal discontinuous ribs 222a, 222b, 222c and the first, second, and third outlet longitudinal discontinuous ribs 230a, 230b, 230c. The longitudinal rib apertures may be of a second length 534 that may be approximately similar to the first length 532. For the example in FIG. 5A, the first length 532 of the longitudinal channel apertures 522 and the second length 534 of the longitudinal rib apertures 524 are approximately parallel with the longitudinal axis 210.

The lateral channel apertures 526 are located on the top facing surfaces of the lateral channels 228b and portions of the outer channel 228c that are approximately perpendicular to the longitudinal axis 210 of intermediate plate 500. The lateral channel apertures 526 may be of a third length 536 that may be approximately similar in size to the first length 532 and second length 534. The lateral rib apertures 528 may be located on the top facing surfaces of the first, second, and third lateral discontinuous ribs 224a, 224b, 224c. The lateral rib apertures 528 may have a fourth length 538 that may be approximately similar to the first length 532, second length 534, and third length 536. The fourth length 538 may be approximately perpendicular to the longitudinal axis and approximately parallel with the length of the first, second, and third lateral discontinuous ribs 224a, 224b, 224c.

It is to be appreciated for other examples, the first length 532, second length 534, third length 536, and fourth length 538 may not be similar to one another. It is also to be appreciated that the first length 532, second length 534, third length 536, and fourth length 538 may be non-uniform and vary with each aperture.

In the dense heat transfer region 310 of the intermediate plate 500 may have an increased quantity of longitudinal channel apertures 522 and longitudinal rib apertures 524. The increase in longitudinal channel apertures 522 and longitudinal rib apertures 524 may increase the brazing between the intermediate plate 500 and the outer plates, and may increase the rate of heat transfer when thermal exchange medium fluid near the outlet region 218 approaches the temperature of a battery, such as the battery 58.

Figure 5B:
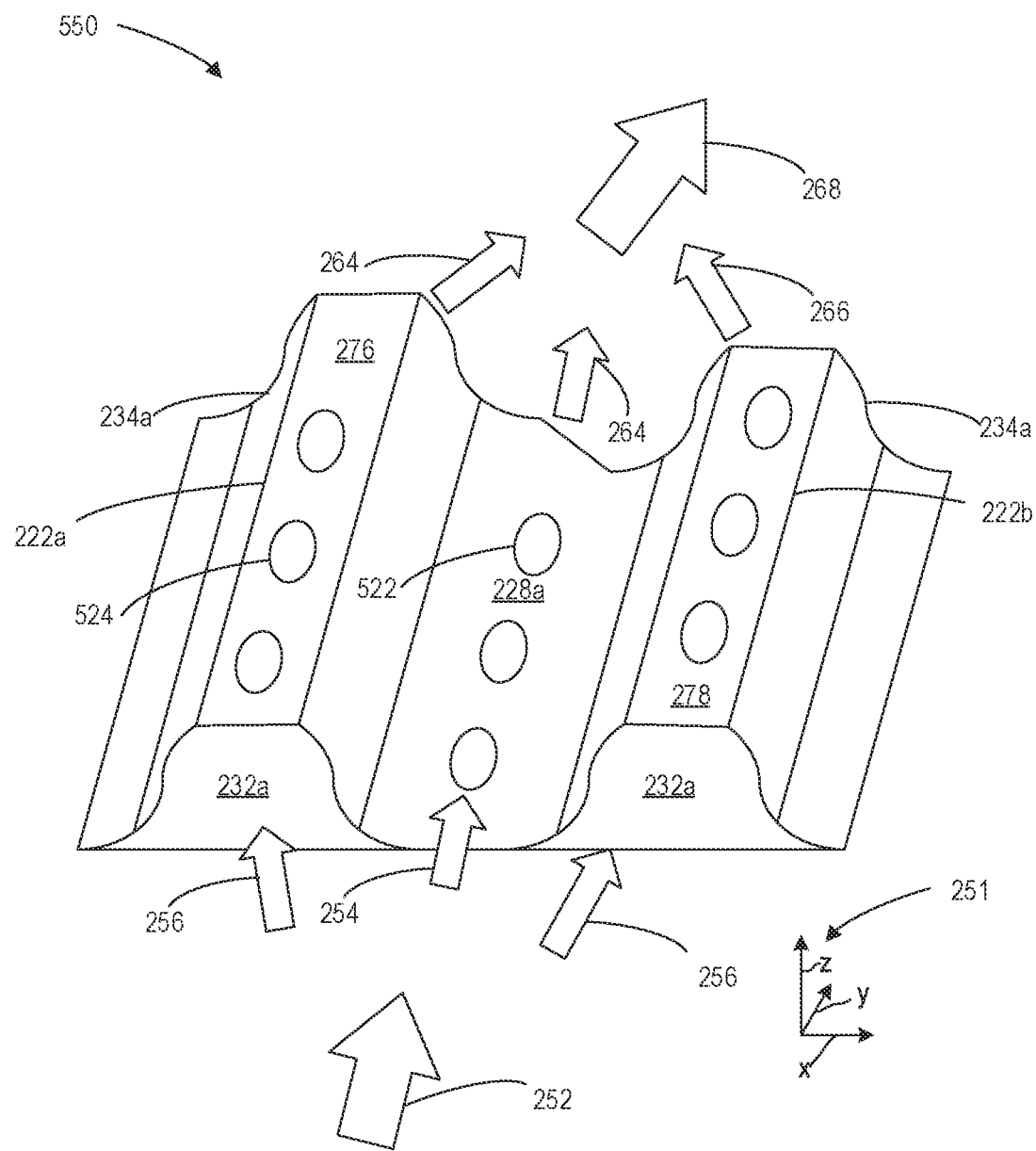
FIG. 5B shows an isometric view of a section of the fourth example embodiment of a heat exchanger intermediate plate.

Turning to FIG. 5B, a rib schematic 550 of first and second inlet longitudinal discontinuous ribs 222a, 222b and a longitudinal channel 228a are shown from an isometric perspective. The rib schematic 550 may be taken from the intermediate plate 500, wherein the first and second inlet longitudinal discontinuous ribs 222a, 222b may have longitudinal rib apertures 524 and a longitudinal channel 228a may have longitudinal channel apertures 522.

Turning to FIG. 6A shows a top view of a schematic example of an intermediate plate of a fifth embodiment referred to as intermediate plate schematic 600. The intermediate plate schematic 600 may also be referred to herein as an intermediate plate 600. The intermediate plate 600 may be the intermediate plate of a heat exchanger, such as the heat exchanger 68.

The intermediate plate 600 shares many features of the intermediate plate 200, such as the features on the inlet side 206, the dividing rib 226, and the first, second, and third lateral discontinuous ribs 224a, 224b, 224c.

The intermediate plate 600 has a plurality of delta features located on the upward facing surfaces of the discontinuous ribs and the channels. The delta features include features, such as a delta protrusion (e.g., delta protrusion 654 of FIG. 6C and delta protrusion of FIG. 6D), to break the boundary layer and create turbulence in thermal exchange medium fluid. The purpose of these delta features would be to both locally enhance heat transfer through boundary layer break up and add additional surface area. For the intermediate plate 600 there may be plurality of delta features: first longitudinal rib delta features 622a, second longitudinal rib delta features 622b, first longitudinal channel delta features 624a, second longitudinal channel delta features 624b, lateral rib delta features 626, lateral channel delta features 628, and dividing rib delta features 630.

For example, each of the first longitudinal rib delta features 622a, second longitudinal rib delta features 622b, first longitudinal channel delta features 624a, second longitudinal channel delta features 624b, lateral rib delta features 626, lateral channel delta features 628, and dividing rib delta features 630 may be of a similar length, size, and shape. However, it is to be appreciated that the lengths, sizes, and shapes of the of the first longitudinal rib delta features 622a, second longitudinal rib delta features 622b, first longitudinal channel delta features 624a, second longitudinal channel delta features 624b, lateral rib delta features 626, lateral channel delta features 628, and dividing rib delta features 630 may vary between example plates and with one another in other examples. Additionally, it is to be appreciated lengths, sizes, and shapes of the first longitudinal rib delta features 622a, second longitudinal rib delta features 622b, first longitudinal channel delta features 624a, second longitudinal channel delta features 624b, lateral rib delta features 626, lateral channel delta features 628, and dividing rib delta features 630 are non-uniform and may vary with each delta feature. Additionally, it is to be appreciated that the density (e.g., the quantity of per region) of the first longitudinal rib delta features 622a, second longitudinal rib delta features 622b, first longitudinal channel delta features 624a, second longitudinal channel delta features 624b, lateral rib delta features 626, lateral channel delta features 628, and dividing rib delta features 630 may vary between regions of an intermediate plate 500.

The first longitudinal rib delta features 622a may be located on the top facing surfaces of the first, second, and third inlet longitudinal discontinuous ribs 222a, 222b, 222c on the inlet side 206. The second longitudinal rib delta features 622b may be located on the top facing surfaces of the first, second, and third outlet longitudinal discontinuous ribs 230a, 230b, 230c on the outlet side 208. The first and second longitudinal rib delta features 622a, 622b may be of a first length 632. The first longitudinal channel delta features 624a are located on the bottom facing surfaces of the longitudinal channels 228a, the dividing channels 228d, and portions of the outer channel 228c on the outlet side 208. The second longitudinal channel delta features 624b are located on the bottom facing surfaces of the longitudinal channels 228a, the dividing channels 228d, and portions of the outer channel 228c on the outlet side 208. The first and second longitudinal channel delta features 624a, 624b may be of a second length 634.

For the example in FIG. 6A, the first length 632 of the first and second longitudinal rib delta features 622a, 622b and the second length 634 of the first and second longitudinal channel delta features 624a, 624b are approximately parallel with the longitudinal axis 210. The delta features are positioned with respect to the flow of thermal exchange medium fluid, therein, the second longitudinal rib delta features 622b may appear rotated at an angle of approximately 180 degrees compared to the first longitudinal rib delta features 622a. Additionally, the second longitudinal channel delta features 624b may be rotated at an angle of approximately 180 degrees from the first longitudinal channel delta features 624a. The position of the second longitudinal rib delta feature 622b and the second longitudinal channel delta features 624b helps the delta features make the current more turbulent helping to make thermal exchange medium fluid more uniform in temperature and promote heat transfer.

The lateral rib delta features 626 may be located on the top facing surfaces of the first, second, and third lateral discontinuous ribs 224a, 224b, 224c. The lateral channel delta features 628 are located on the bottom facing surfaces of the lateral channels 228b and portions of the outer channel 228c approximately perpendicular to the longitudinal axis. The lateral rib delta features 626 may be of a third length 636 and the lateral channel delta features 628 may be of a fourth length 638 that may be perpendicular to the longitudinal axis 210.

The dividing rib delta features 630 may be located on the upper surface of the dividing rib 226. The dividing ribs may be of a fifth length 639 that is parallel with the longitudinal axis 210. The dividing rib delta features 630 may be positioned in the same direction longitudinally as the first longitudinal rib delta features 622a and the first longitudinal channel delta features 624a.

For one example, first length 632, second length 634, third length 636, fourth length 638, and fifth length 639 may be of an approximately similar distance. However, it is to be appreciated, that for other examples the first length 632, second length 634, third length 636, fourth length 638, and fifth length 639 may be of different distances between one another. It is also to be appreciated, that for other examples the first length 632, second length 634, third length 636, fourth length 638, and fifth length 639 may be non-uniform and vary with each delta feature. For example, the first length 632, second length 634, third length 636, fourth length 638, and fifth length 639 may vary depending on the region of an intermediate plate 600.

Turning to FIG. 6B, a rib schematic 640 of first and second inlet longitudinal discontinuous ribs 222a, 222b and a longitudinal channel 228a are shown from an isometric perspective. The rib schematic 640 may be taken from an intermediate plate with delta features, such as the intermediate plate 600. The first and second inlet longitudinal discontinuous ribs 222a, 222b have first longitudinal rib delta features 622a and a longitudinal channel 228a has first longitudinal channel delta features 624a.

The first inlet longitudinal discontinuous rib 222a may be divided into symmetrical halves by a first cross section plane 642 parallel with a plane formed by the y-z axes. The longitudinal channel 228a may be divided into symmetrical halves by a second cross section plane 644 parallel with a plane formed by the y-z axes.

Thermal exchange medium fluid may flow into and out of the first and second inlet longitudinal discontinuous ribs 222a, 222b and the longitudinal channel 228a similar to in FIG. 2B.

FIG. 6C shows a cross-section view 651 of the first cross section plane 642 taken on the first inlet longitudinal discontinuous rib 222a of the intermediate plate 600 from the side with respect to the x-axis. The cross-section view 651 shows a bottom plate 646 locate below and a top plate 648 located above the first inlet longitudinal discontinuous rib 222a and intermediate plate 600 with respect to the z-axis. The top plate 648 may abut the upper surface of the first inlet longitudinal discontinuous rib 222a.

Cross-section view 651 shows a delta feature 650 part of the first inlet longitudinal discontinuous rib 222a. For this example, delta feature 650 is a first longitudinal rib delta feature 622a. However, for other examples the delta feature 650 may be either a first longitudinal rib delta feature 622a, a second longitudinal rib delta feature 622b, a lateral rib delta features 626, or the or a dividing rib delta feature 630.

Also shown, is a bottom plate 646 locate below and a top plate 648 located above the first inlet longitudinal discontinuous rib 222a and intermediate plate 600 with respect to the z-axis. The top plate 648 may abut the upper surface of the first inlet longitudinal discontinuous rib 222a.

The delta feature 650 may have a delta aperture 652 that may abut the top plate 648 and a delta protrusion 654 that may extend toward the bottom plate 646 at an angle between 0 and 90 degrees from the y-axis. Thermal exchange medium fluid of a rib flow 660 may flow through first inlet longitudinal discontinuous rib 222a toward the delta feature 650. The delta protrusion 654 may cause turbulence and the rib flow 660 to divide into a plurality smaller flows: a delta aperture flow 660a, an internal flow 660b, a delta protrusion flow 660c, and a back flow 660d.

The delta aperture flow 660a may be influenced by the delta protrusion to flow toward the delta aperture 652 and against a forward surface 654a of the delta protrusion 654. The internal flow 660b may continue in a similar path as the rib flow 660 or be driven toward the surface of the bottom plate 646. The delta protrusion flow 660c may travel against a rear surface 654b of delta protrusion 654 and/or toward the lower surface of the first inlet longitudinal discontinuous rib 222a. The back flow 660d may be formed as the delta aperture flow 660a is forced against the top plate 648. The back flow 660d may flow in the opposite direction of the delta aperture flow 660a.

The delta aperture flow 660a, delta protrusion flow 660c, and delta aperture back flow 660d may drive fluid against the delta protrusion 654. The increased surface area provided by the delta protrusion 654 may allow additional opportunities for and greater amounts of thermal energy exchange. The disruption of the rib flow 660 into smaller flows may mix thermal exchange medium fluid that may be a different temperature at the center compared to the edges of the rib flow 660, promoting convection and increased temperature uniformity along the z-axis. Additionally, thermal exchange medium fluid may be driven to the surfaces of the first inlet longitudinal discontinuous rib 222a, the bottom plate 646, the top plate 648, and the delta protrusion 654. These actions therein, may increase the efficiency and rate of heat transfer in the first inlet longitudinal discontinuous rib 222a.

FIG. 6D shows a cross-section view 668 of the second cross section plane 644 taken on a longitudinal channel 228a of the intermediate plate 600 from the side with respect to the x-axis. The cross-section view 668 shows a bottom plate 646 locate below and a top plate 648 located above the longitudinal channel 228a and intermediate plate 600 with respect to the z-axis. The top plate 648 may abut the upper surface of the first inlet longitudinal discontinuous rib 222a.

The cross-section view 668 shows a delta feature 670 part of a longitudinal channel 228a. For this example, delta feature 670 is a first longitudinal channel delta feature 624a. However, for other examples the delta feature 670 may be either a first longitudinal channel delta feature 624a, a second longitudinal channel delta feature 624b, or a lateral channel delta features 628.

Also shown, is a bottom plate 646 locate below and a top plate 648 located above the longitudinal channel 228a and intermediate plate 600 with respect to the z-axis. The bottom plate 646 may abut the lower surface of the longitudinal channel 228a and intermediate plate 600.

The delta feature 670 may have a delta aperture 672 that may abut the bottom plate 646 and a delta protrusion 674 that may extend toward the top plate 648 at an angle between 0 and 90 degrees from the y-axis. Thermal exchange medium fluid of a channel flow 680 may flow through the longitudinal channel 228a toward the delta feature 670. The delta protrusion 674 may cause turbulence and the channel flow 680 to divide into a plurality smaller flows: a delta aperture flow 680a, an internal flow 680b, a delta protrusion flow 680c, and a delta aperture back flow 680d.

The delta aperture flow 680a may be influenced by the delta protrusion to flow toward the delta aperture 672 and against a forward surface 674a of the delta protrusion 674. The internal flow 680b may continue in a similar path as the channel flow 680 or be driven toward the top plate 648. The delta protrusion flow 680c may travel against a rear surface 674b of the delta protrusion 674 and/or toward the upper surface of the longitudinal channel 228a. The delta aperture back flow 680d may be formed by the delta aperture flow 660a being forced against the top plate 648. The back flow 680d may flow in the opposite direction of the delta aperture flow 680a.

The delta aperture flow 680a, delta protrusion flow 680c, and delta aperture back flow 680d may drive fluid against the delta protrusion 674. The increased surface area provided by the delta protrusion 674 may allow additional opportunities for and greater amounts of thermal energy exchange. The disruption of the channel flow 680 into smaller flows may mix thermal exchange medium fluid that may be cooler at the center with warmer thermal exchange medium fluid near the edges of the channel flow 680, promoting convection. Additionally, thermal exchange medium fluid may be driven to the surfaces of the longitudinal channel 228a, the bottom plate 646, the top plate 648, and the delta protrusion 674. These actions therein, may increase the efficiency and rate of heat transfer in the longitudinal channel 228a.

Figure 7:
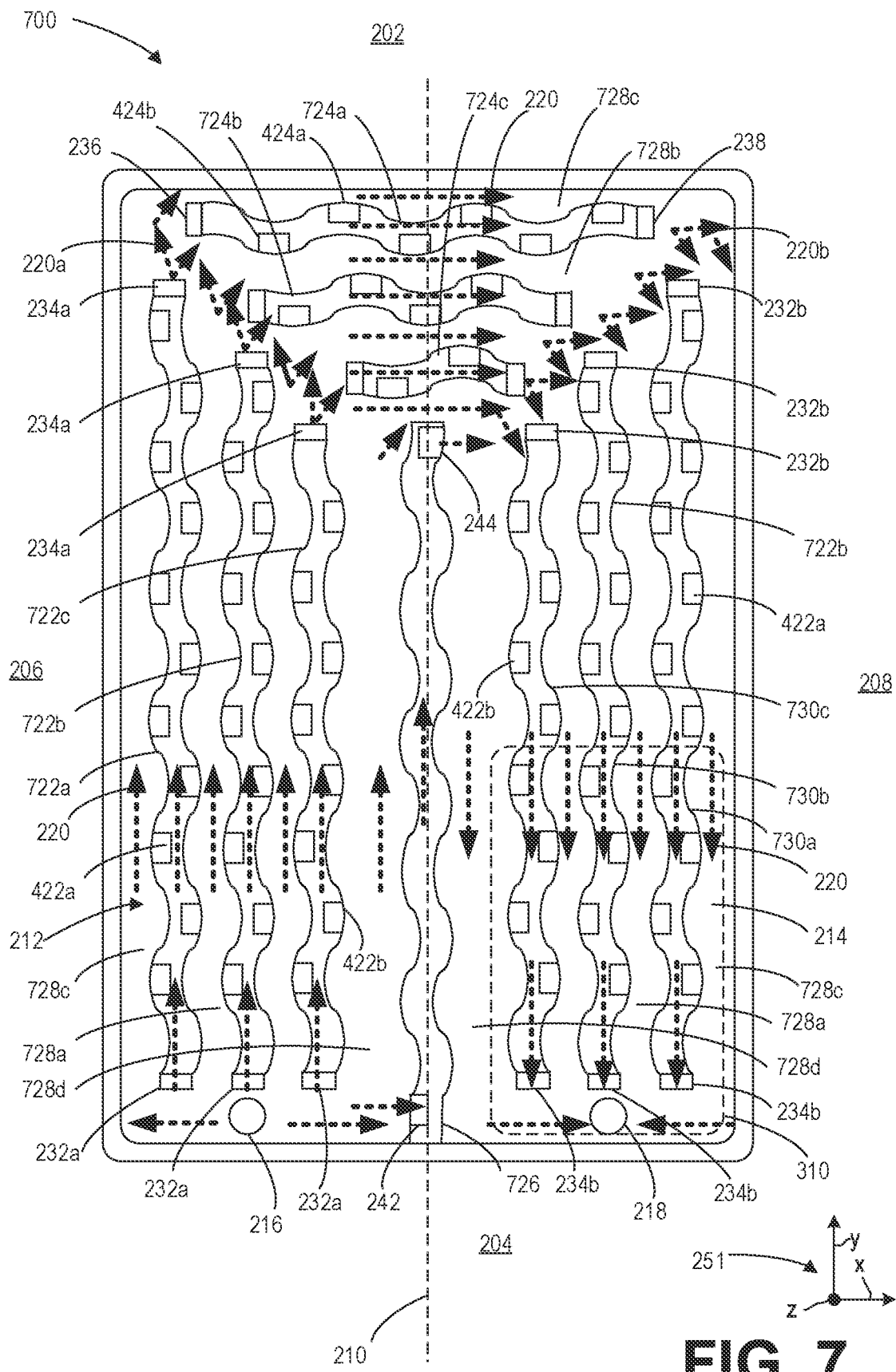
FIG. 7 shows a top view of a schematic of a sixth example embodiment of a heat exchanger intermediate plate.

Turning to FIG. 7 shows a top view of a schematic example of an intermediate plate of a sixth embodiment referred to as intermediate plate schematic 700. The intermediate plate schematic 700 may also be referred to herein as intermediate plate 700. The intermediate plate 700 may be the intermediate plate of a heat exchanger, such as the heat exchanger 68.

The intermediate plate 700 has a plurality of longitudinal and lateral discontinuous ribs that may be wavelike pattern with a plurality of curves that are smooth. Additionally, the intermediate plate 700 has a continuous rib in the form of the dividing rib 726 that is of a shape similar to a wavelike pattern with a plurality of curves that are smooth. The curves of the dividing rib 726 may be described as sinusoidal and similar to a sinusoidal function. The dividing rib 726 may be referred to herein, as a sinusoidal dividing rib 726. The curvature and wavelike pattern of the ribs increase the surface area of intermediate plate 700, and therein may increase the rate and efficiency of heat transfer.

The inlet side 206 of the intermediate plate 700 has a plurality of discontinuous ribs in the form of the first inlet longitudinal sinusoidal rib 722a, a second inlet longitudinal sinusoidal rib 722b, and a third inlet longitudinal sinusoidal rib 722c. The outlet side 208 of the intermediate plate 700 has a has a plurality of discontinuous ribs in the form of the first outlet longitudinal sinusoidal rib 730a, a second outlet longitudinal sinusoidal rib 730b, and a third outlet longitudinal sinusoidal rib 730c. The first, second, and third inlet longitudinal sinusoidal ribs 722a, 722b, 722c and the first, second, and third outlet longitudinal sinusoidal ribs 730a, 730b, 730c have a plurality of curves, and have centerlines that may be approximately parallel to longitudinal axis 210 and to one another. Toward the first side 202, the intermediate plate 700 has a plurality of lateral discontinuous ribs in the form of the first lateral sinusoidal rib 724a, the second lateral sinusoidal rib 724b, third lateral sinusoidal rib 724c. The first, second, and third lateral sinusoidal ribs 724a, 724b, 724c have a plurality of curves, and have centerlines that may be approximately perpendicular to the longitudinal axis 210. The curvature and shape of the inlet longitudinal sinusoidal ribs 722a, 722b, 722c, the outlet longitudinal sinusoidal ribs 730a, 730b, 730c, and the lateral sinusoidal ribs 724a, 724b, 724c may increase the surface area of intermediate plate 700 available for heat transfer compared to intermediate plate 200 or a similar embodiment.

A sinusoidal dividing rib 726 extends along and may have a centerline approximately collinear with the longitudinal axis 210. Like the dividing rib 226, the dividing rib 726 may divide the intermediate plate 700 into an inlet portion closer to the inlet side 206 and an outlet portion closer to the outlet side 208. The sinusoidal dividing rib 726 has a plurality of curves, a shape similar to a sinusoidal wave, and is continuous. Likewise, the curvature and shape of sinusoidal dividing rib 726 may increase the surface area of the intermediate plate 700 available for heat transfer compared to intermediate plate 200 or a similar embodiment.

Located between the inlet longitudinal sinusoidal ribs 722a, 722b, 722c and the outlet longitudinal sinusoidal ribs 730a, 730b, 730c are a plurality of sinusoidal longitudinal channels 728a that have a similar sinusoidal wave like shape with a plurality of curves. Located between the lateral sinusoidal ribs 724a, 724b, 724c are a plurality of sinusoidal lateral channels 728b that have a similar sinusoidal wave like shape with a plurality of curves. Between the third inlet longitudinal sinusoidal rib 722c, the third outlet longitudinal sinusoidal rib 730c, and the sinusoidal dividing rib 726 are a plurality of sinusoidal dividing channels 728d that have a similar sinusoidal wave like shape with a plurality of curves. Between the first inlet longitudinal sinusoidal rib 722a, the first lateral sinusoidal rib 724a, the first outlet longitudinal sinusoidal rib 730a, and plate walls 214 is an outer channel 728c that extends with the perimeter of the plate depression 212. The portions of the outer channel 728c closest to the first inlet longitudinal sinusoidal rib 722a, the first lateral sinusoidal rib 724a, the first outlet longitudinal sinusoidal rib 730a may be curved and sinusoidal in shape, and may referred to herein as a sinusoidal outer channel 728c. The curvature and sinusoidal shape of the sinusoidal longitudinal channels 728a, the sinusoidal lateral channels 728b, the sinusoidal outer channel 728c, and the sinusoidal dividing channels 728d increase the surface area of the intermediate plate 700 compared to intermediate plate 200, and therein may increase efficiency and rate of heat transfer.

The first, second, and third inlet longitudinal sinusoidal ribs 722a, 722b, 722c and the first, second, and third outlet longitudinal sinusoidal ribs 730a, 730b, 730c decrease in length with respect to the longitudinal axis 210 and y-axis closer to the sinusoidal dividing rib 726 and longitudinal axis 210 laterally with respect to the x-axis. For example, first inlet longitudinal sinusoidal rib 722a extends a greater length with respect to the longitudinal axis 210 than the second inlet longitudinal sinusoidal rib 722b. The second inlet longitudinal sinusoidal rib 722b is closer laterally with respect to the x-axis to longitudinal axis 210 and the sinusoidal dividing rib 726 compared to the first inlet longitudinal sinusoidal rib 722a. For another example, the first outlet longitudinal sinusoidal rib 730a extends a greater length with respect to the longitudinal axis 210 than second outlet longitudinal sinusoidal rib 730b that is closer laterally with respect to the x-axis to longitudinal axis 210 and sinusoidal dividing rib 726.

The first, second, and third lateral sinusoidal ribs 724a, 724b, 724c decrease in length—e.g., with respect to the x-axis, when closer to the sinusoidal dividing rib 726 of the intermediate plate 700. For example, in the intermediate plate 700 the first lateral sinusoidal rib 724a is longer (e.g., with respect to the x-axis) compared to the second lateral sinusoidal rib 724b that is located closer to the sinusoidal dividing rib 726 with respect to the y-axis.

The first, second, and third inlet longitudinal sinusoidal ribs 722a, 722b, 722c and the first, second, and third outlet longitudinal sinusoidal ribs 730a, 730b, 730c may have a plurality of first and second longitudinal slots 422a, 422b. Thermal exchange medium fluid may cross between the first, second, and third inlet longitudinal sinusoidal ribs 722a, 722b, 722c and the sinusoidal longitudinal channels 728a, the sinusoidal outer channel 728c, or the sinusoidal dividing channels 728d via the first and second longitudinal slots 422a, 422b. Thermal exchange medium fluid may cross between the first, second, and third outlet longitudinal sinusoidal ribs 730a, 730b, 730c and the sinusoidal longitudinal channels 728a, the sinusoidal outer channel 728c, or the sinusoidal dividing channels 728d via the first and second longitudinal slots 422a, 422b.

The first, second, and third lateral sinusoidal ribs 724a, 724b, 724c may have a plurality of first and second lateral slots 424a, 424b. Thermal exchange medium fluid may cross between the first, second, and third lateral sinusoidal ribs 724a, 724b, 724c and the sinusoidal lateral channels 728b or the sinusoidal outer channel 728c via the first and second lateral slots 424a, 424b.

It is to be appreciated, that the thermal exchange medium flow paths 220 may have an average linear direction and be represented by linear arrows for intermediate plate 700; however, the thermal exchange medium flow paths 220 may change direction with the curvature of the ribs and channels.

It is to be appreciated that the features described in FIG. 2A-7 may be non-limiting, and various combinations of features and components from intermediate plate 200, intermediate plate 300, intermediate plate 400, intermediate plate 500, intermediate plate 600, and intermediate plate 700 may be found in similar intermediate plates.

Turning to FIG. 8A shows an isometric view of a heat exchanger 800 when fully assembled. The heat exchanger 800 may be the same or similar to heat exchanger 68.

Heat exchanger 800 may be formed of a top plate 802, an intermediate plate 804, and a bottom plate 806 seen in greater detail in FIG. 8B. The top plate 802 and bottom plate 806 may act as a first outer plate and a second outer plate, respectively. The top plate 802 and bottom plate 806 may be the top plate 648 and bottom plate 646 of FIG. 6C-6D, respectively. The intermediate plate 804 may be an intermediate plate based on any of the intermediate plate schematics, such as intermediate plate 200, intermediate plate 300, intermediate plate 400, intermediate plate 500, intermediate plate 600, or intermediate plate 700, shown in FIG. 2A-7. For one example a battery, such as battery 58, may rest on and abut the top plate 802 of the heat exchanger 800, acting as a cold plate heat exchanger. For another example a battery may be located below and abut the bottom plate 806 of heat exchanger 800 and acting as a cold plate heat exchanger. For another example heat exchanger 800 may be positioned between the cells of and in the center of a battery, wherein the top plate 802 and bottom plate 806 may abut cells and other components of the battery. For this example, the heat exchanger 800 may act as an ICE plate.

The heat exchanger 800 may be divided by a cross-section plane 803 approximately coplanar with a plane formed by the x and z axes. The cross-section plane 803 may be used to form FIG. 8B and show additional details of the interior elements and components of heat exchanger 800.

Located on the top plate 802 of the heat exchanger 800 are an inlet port 812 and an outlet port 814, that may be a fluid inlet and a fluid outlet, respectively. The top plate 802 may have a flat surface facing the top and the bottom plate 806 may have a flat surface facing the bottom. The inlet port 812 and outlet port 814 extend upward along and with respect to the z-axis. Thermal exchange medium fluid may flow into the inlet port 812 and out of the outlet port 814 the heat exchanger 800 through a fluidic coupling to a thermal exchange medium fluid reservoir via fluid transmitters, such as hoses or tubing. The thermal exchange medium fluid removed from the heat exchanger via the outlet port 814 may travel to a region of a vehicle, such as another component that needs to be modulate and/or a second heat exchanger, to return the thermal exchange medium fluid to an inlet temperature before being cycled back to a thermal exchange medium fluid reservoir or the inlet port 812. A second heat exchanger in conjunction with a controller may also be used to change the temperature of the thermal exchange medium fluid returning to the inlet port 812 to modulate the temperature in the heat exchanger 800 if a battery lowers or rises in temperature.

Between inlet port 812 and 814 is a cross-section view 820 of the heat exchanger 800 viewed from the side into the y-axis. The cross-section view 820 may be taken along cross-section plane 803 showing the interior portions of the heat exchanger 800.

The intermediate plate 804 may be located between the top plate 802 and the bottom plate 806, wherein, the intermediate plate 804 may abut the lower surface of the top plate 802 and the upper surface of the bottom plate 806.

For one example, the top plate 802, intermediate plate 804, and bottom plate 806 form a shelf 816. However, for other examples a top plate may be similar to bottom plate 806 and not be flat, and may be referred to as a formed plate. For these examples, a top plate that is a formed plate may form a second shelf that may mirror shelf 816 above the intermediate plate 804. On the top plate 802 the cross-section view 820 shows the inlet port 812 may have an inlet port coupling 812a and the outlet port 814 may have an outlet port coupling 814a. The inlet port coupling 812a may help the inlet port 812 and the outlet port coupling 814a may help the outlet port 814 fluidically couple to fluid transmitters, such as hoses or tubing.

In FIG. 8B the shelf 816 may be located and visible on the inlet side 206 and the outlet side 208. The shelf 816 may extend around the perimeter of the heat exchanger 800. The bottom plate 806 forms a depression 818 within borders of the shelf 816, that may be referred to herein as a plate depression 818. The plate depression 818 may be formed via stamping, machining, or forming. A plurality of longitudinal ribs 822 and longitudinal channels 824 formed by the intermediate plate 804 may be contained and be supported by the plate depression 818. The perimeter of the plate depression 818 of the bottom plate 806 is surrounded by a wall 819 that may transition into the shelf 816. The wall 819 prevents thermal exchange medium fluid located between the top plate 802 and bottom plate 806 from leaking or leaving the heat exchanger 800 with exception to the outlet port 814.

A plurality of first passages 826 may be formed between the longitudinal ribs 822 of the intermediate plate 804 and the bottom plate 806. Likewise, a plurality of second passages 828 may be formed between the longitudinal channels 824 of the intermediate plate 804 and the top plate 802. Thermal exchange medium fluid may flow between the first passages 826 of the longitudinal ribs 822 and the second passages 828 of the longitudinal channels 824. Thermal exchange medium fluid in the longitudinal ribs 822 may contact the material of the bottom plate 806 in the plate depression 818 and on the wall 819. For example, thermal exchange medium fluid in longitudinal channels 824 may contact the material of the top plate 802. For this example, thermal exchange medium fluid therein may engage in more heat transfer with the bottom plate 806 in the longitudinal ribs 822 and other ribs compared to thermal exchange medium fluid in the channels, such as longitudinal channels 824. For another example, thermal exchange medium fluid may engage in more heat transfer with the top plate 802 in the longitudinal channels 824 and other channels compared thermal exchange medium fluid in the ribs, such as longitudinal ribs 822.

For example, the heat exchanger 800 may remove heat from a battery, such as battery 58. Heat may be transferred from a battery, such as battery 58 to the top plate 802 and/or the bottom plate 806 of the heat exchanger 800 through conduction. Heat from the battery may be transferred through conduction and convection between the top plate 802 and bottom plate 806 to the thermal exchange medium fluid. Additionally, heat may be transferred through conduction between top plate 802 and bottom plate 806 to the intermediate plate 804, wherein the intermediate plate 804 may transfer energy to the thermal exchange medium fluid via conduction and convection. Thermal exchange medium fluid may be removed from the heat exchanger 800 through the outlet port 814 removing thermal energy from the heat exchanger 800. New thermal exchange medium fluid may be introduced through the inlet port 812 to replace thermal exchange medium fluid removed through the outlet port 814. The cycling of thermal exchange medium fluid uptakes thermal energy and maintains the temperature near an equilibrium for the battery and the top plate 802 and bottom plate 806.

Thermal exchange medium fluid may flow in a positive direction in the longitudinal ribs 822 and longitudinal channels 824 on the inlet side 206 or negative direction on the outlet side 208 with respect to the y-axis.

Turning to FIG. 8C shows an exploded view 830 of heat exchanger 800 from an isometric perspective. The features of top plate 802, intermediate plate 804, and bottom plate 806 may be visible.

The shelf 816 may be formed an intermediate plate shelf 832 of the intermediate plate 804 and a bottom plate shelf 834 of the bottom plate 806. Likewise, the plate depression 818 may be formed from a bottom plate depression 836 of the bottom plate 806 and an intermediate plate depression 838 of the intermediate plate 804. The walls 819 may be formed from bottom plate walls 819a of the bottom plate 806 and intermediate plate walls 819b of the intermediate plate 804. The bottom plate shelf 834 and the bottom plate depression 836 may abut the intermediate plate shelf 832 from below with respect to the z-axis. The intermediate plate shelf 832 may abut the lower surface of the top plate 802 from below with respect to the z-axis.

The perimeter of intermediate plate walls 819b and the features in the intermediate plate depression 838 form an outer channel 840. Outer channel 840 may function similarly to outer channel 228c.

Within the intermediate plate depression 838 and perimeter of the outer channel 840 and, the longitudinal ribs 822 may be formed from the material of intermediate plate 804. The longitudinal ribs 822 may be formed of a plurality of inlet side longitudinal ribs 822a, outlet side longitudinal ribs 822b, and dividing rib 846. The plurality of inlet side longitudinal ribs 822a are discontinuous and may function similarly to first, second, and third inlet longitudinal discontinuous ribs 222a, 222b, 222c. The outlet side longitudinal ribs 822b are discontinuous and may function similarly to first, second, and third outlet longitudinal discontinuous ribs 230a, 230b, 230c. Likewise, there are a plurality of inlet side longitudinal channels 824a between the inlet side longitudinal ribs 822a and a plurality of outlet side longitudinal channels 824b located between the outlet side longitudinal ribs 822b that may functions similarly to the longitudinal channels 228a. However, there may be a greater plurality of inlet side longitudinal ribs 822a, outlet side longitudinal ribs 822b in intermediate plate 804 compared to first, second, and third inlet longitudinal discontinuous ribs 222a, 222b, 222c and first, second, and third outlet longitudinal discontinuous ribs 230a, 230b, 230c. Dividing rib 846 functions similarly to the dividing rib 226 and dividing rib 726. The dividing rib 846 may divide the heat exchanger 800 into an inlet portion closer to the inlet side 206 and an outlet portion closer to the outlet side 208.

Near the first side 202 of the intermediate plate depression 838 are a plurality of lateral ribs 854 and lateral channels 856 formed from the material of the intermediate plate 804. The lateral ribs 854 are discontinuous and may function similarly to the first, second, and third lateral discontinuous ribs 224a, 224b, 224c. The lateral channels 856 may function similarly to lateral channels 228b.

Visible on each of the inlet side longitudinal ribs 822a is a first longitudinal rib first opening 862, wherein fluid may enter the inlet side longitudinal ribs 822a. Visible on each of the outlet side longitudinal ribs 822b is a second longitudinal rib second opening 864, wherein fluid may exit the outlet side longitudinal ribs 822b.

Turning to FIG. 9A and FIG. 9B, FIG. 9A shows a first isometric view 900 and FIG. 9B shows a second isometric view 940 of an intermediate plate. For this example, the intermediate plate may be the intermediate plate 804 from FIG. 8B-8C. The first isometric view 900 shows the intermediate plate 804 closer to the second side 204. The second isometric view 940 shows the intermediate plate 804 closer to the first side 202.

Intermediate plate 804 has inlet manifold 904 located between the plurality of first longitudinal rib first opening 862 and the intermediate plate shelf 832 near the second side 204, wherein thermal exchange medium fluid may collect and be distributed from the inlet port 812. Likewise, an outlet manifold 906 of similar dimension may be located between the plurality of second longitudinal rib second openings 864 and the intermediate plate shelf 832 near the second side 204, wherein thermal exchange medium fluid may collect and be up taken by the outlet port 814. An inlet trough 908 may be located between the first longitudinal rib first openings 862 and the inlet manifold 904 with respect to the y-axis and below the inlet manifold 904 with respect to the z-axis. An outlet trough 910 may be located between the second longitudinal rib second openings 864 and the outlet manifold 906 with respect to the y-axis and below the inlet manifold 904 with respect to the z-axis. The inlet and outlet troughs 908, 910 are cutouts that may help with the formability of the ribs and channels of the intermediate plate 804. The inlet trough 908 may connect the plurality of first longitudinal rib first openings 862 and the outlet trough 910 may connect the plurality of second longitudinal rib second openings 864. The inlet trough 908 and outlet trough 910 may provide additional volume for thermal exchange medium fluid to accumulate. Additionally, the inlet trough 908 and outlet trough 910 may decrease the resistance to flow of thermal exchange medium fluid into and out of the inlet and outlet side longitudinal ribs 822a, 822b via the increase surface area of the first longitudinal rib first openings 862 and second longitudinal rib second openings 864. It is to be appreciated, that for other examples the intermediate plate 804 may use individual cutouts, similar to a depression 942a in FIG. 9B, for each rib in place of the inlet and outlet troughs 908, 910.

The dividing rib 846 has a dividing rib first opening 912 and a dividing rib second opening 914 that may function similarly to the first dividing rib opening 242 and the second dividing rib opening 244 of intermediate plate 200.

In FIG. 9B, the second isometric view 940 shows that each of the inlet side longitudinal ribs 822a have a first longitudinal rib second opening 942 and each of the outlet side longitudinal ribs 822b have a second longitudinal rib first opening 962. Additionally, the second isometric view 940 shows each of the lateral ribs 854 has a lateral rib first opening 954 and a lateral rib second opening 956.

The first longitudinal rib second opening 942 may be located in a depression 942a cut into the material of the intermediate plate depression 838 along the z-axis. The depression 942a is lower with respect to the z-axis than the material of the inlet side longitudinal channels 824a, the lateral channels 856, the outer channel 840, and the intermediate plate depression 838. Likewise, the second longitudinal rib first opening 962 may be located in a depression 962a cut in the of the material of the intermediate plate depression 838 along the z-axis. The depression 962a is lower with respect to the z-axis than the outlet side longitudinal channels 824b of the outlet side longitudinal channels 824b, the lateral channels 856, and the outer channel 840. The lateral rib first opening 954 may be located in a depression 954a and the lateral rib second opening 956 may be located in a depression 956a. Both depressions 954a, 956a are cut into the material of the intermediate plate depression 838 along the z-axis. The depression 954a and depression 956a are lower with respect to the z-axis than the material of the inlet side longitudinal channels 824a, outlet side longitudinal channels 824b, the lateral channels 856, and the outer channel 840.

Like the inlet trough 908 and outlet trough 910 the depressions 942a, 954a, 956a, and 962a may be cutouts used primarily to form and increase the formability of their respective ribs. Like the inlet trough 908, depression 954a and depression 962a may decrease the resistance to flow of thermal exchange medium fluid via increasing the surface area to the lateral rib first opening 954 and the second longitudinal rib first opening 962, respectively. Like the outlet trough 910, depression 942a and depression 956a may decrease the resistance to flow of thermal exchange medium fluid via increasing the surface area out of the first longitudinal rib second opening 942 and lateral rib second opening 956, respectively. Additionally, inlet trough 908 and outlet trough 910 may provide additional volume for thermal exchange medium fluid to accumulate in depression before entering a channel. Unlike the inlet and outlet troughs 908, 910, there may be a depression 942a, depression 954a, depression 956a, and depression 962a for each first longitudinal rib second opening 942, lateral rib first opening 954, lateral rib second opening 956, and second longitudinal rib first opening 962, respectively.

Thus, disclosed herein are designs for a battery cooling heat exchanger that uses an intermediate plate with discontinuous and continuous ribs to transfer heat away and cool a battery in an electric vehicle with a thermal exchange medium fluid as a cooling medium, wherein there may be six example embodiments with different features to change variables of heat transfer shown schematically. In this way, the technical effects of increased heat transfer volume and rates result, while preventing short circuiting of thermal exchange medium fluid flowing through the intermediate plate.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A battery heat exchanger for a vehicle, comprising:
a first outer plate;
a second outer plate positioned in parallel with the first outer plate;
a fluid inlet;
a fluid outlet; and
an intermediate plate positioned between the first outer plate and the second outer plate, the intermediate plate comprising a rib to separate an inlet portion from an outlet portion of the heat exchanger; and a plurality of corrugations with openings for thermal exchange medium fluid flow, wherein the corrugations have different orientations and lengths, and wherein the different orientations include different lateral orientations and different longitudinal orientations, the corrugations along the lateral orientation being shorter than the corrugations along the longitudinal orientation.

2. The battery heat exchanger of claim 1, wherein the corrugations having different lateral orientations are located above a distal end of the rib.

3. The battery heat exchanger of claim 1, wherein the corrugations along the lateral orientation connect the corrugations along the longitudinal orientation in the inlet portion and the corrugations along the longitudinal orientation in the outlet portion.

4. The battery heat exchanger of claim 1, wherein the fluid inlet and the fluid outlet are both positioned on the first outer plate.

5. The battery heat exchanger of claim 4, wherein the fluid inlet and the fluid outlet are both positioned at a same edge of the first outer plate, and wherein the fluid inlet and the fluid outlet are laterally offset from a longitudinal center of the first outer plate.

6. The battery heat exchanger of claim 1, wherein the rib is longitudinally positioned.

7. The battery heat exchanger of claim 1, wherein the rib comprises a first opening and a second opening, and wherein thermal exchange medium enters the rib through the first opening and exits the rib through the second opening.

8. The battery heat exchanger of claim 1, including a plurality of U-shaped thermal exchange medium channels formed via a stack of the first outer plate, the second outer plate, and the intermediate plate, wherein the first outer plate is flat, and wherein the second outer plate is flat.

9. The battery heat exchanger of claim 8, wherein legs of each of the U-shaped thermal exchange medium channels are formed on opposite sides of the intermediate plate.

10. The battery heat exchanger of claim 1, wherein the first outer plate has a flat surface on both an outer and an inner side, and wherein the second outer plate has a flat surface on both an outer and an inner side.

11. A system for a vehicle, comprising:
a traction motor;
a battery electrically coupled to the traction motor; and
a heat exchanger directly adjacent the battery, the heat exchanger including:
a first outer plate;
a second outer plate positioned in parallel with the first outer plate;
a fluid inlet;
a fluid outlet; and
an intermediate plate positioned between the first outer plate and the second outer plate, the intermediate plate comprising a rib to separate an inlet portion from an outlet portion of the heat exchanger; and a plurality of corrugations with openings for thermal exchange medium fluid flow, wherein the corrugations have different orientations and lengths,
wherein the different orientations include different lateral orientations, and wherein the different orientations include different longitudinal orientations, the corrugations along the lateral orientation being shorter than the corrugations along the longitudinal orientation.

12. The system of claim 11, wherein the corrugations along the lateral orientation connect the corrugations along the longitudinal orientation in the inlet portion and the corrugations along the longitudinal orientation in the outlet portion.

13. The system of claim 12, wherein the fluid inlet and the fluid outlet are both positioned on the first outer plate.

14. The system of claim 13, wherein the fluid inlet and the fluid outlet are both positioned at a same edge of the first outer plate, and wherein the fluid inlet and the fluid outlet are laterally offset from a longitudinal center of the first outer plate.

15. The system of claim 14, wherein the first outer plate has a flat surface on both an outer and an inner side, and wherein the second outer plate has a flat surface on both an outer and an inner side.

16. A method of cooling a battery of an electric vehicle, comprising:
flowing cooling into a single inlet and out of a single outlet of a heat exchanger positioned adjacent the battery, the heat exchanger formed from a stack of a first outer plate, and intermediate plate, and a second outer plate positioned in parallel with the first outer plate and the intermediate plate, the cooling divided into a plurality of U-shaped flow channels within the stack, wherein each leg of each U-shaped channel alternates sides of the intermediate plate, and each pair of legs of each U-shaped channel is connected by a lateral rib.

17. The method of claim 16, wherein the intermediate plate includes a rib to separate an inlet portion from an outlet portion of the heat exchanger.

18. The method of claim 17, wherein the intermediate plate includes a plurality of corrugations with openings for thermal exchange medium fluid flow to enable the flow to alternate side of the intermediate plate when flowing in the U-shaped flow channel.

* * * * *